(12) United States Patent
Bethani

(10) Patent No.: US 7,704,317 B2
(45) Date of Patent: Apr. 27, 2010

(54) PYROPROCESSED AGGREGATES COMPRISING IBA AND PFA AND METHODS FOR PRODUCING SUCH AGGREGATES

(75) Inventor: Sophia Bethani, Athens (GR)

(73) Assignee: Alkemy, Ltd., Hamilton (BM)

( * ) Notice: Subject to any disclaimer, the term of this patent is extended or adjusted under 35 U.S.C. 154(b) by 1160 days.

(21) Appl. No.: 11/238,758

(22) Filed: Sep. 28, 2005

(65) Prior Publication Data

US 2006/0162618 A1 Jul. 27, 2006

(51) Int. Cl.
*C04B 14/00* (2006.01)
*C04B 18/06* (2006.01)
*B32B 3/00* (2006.01)

(52) U.S. Cl. .................. 106/705; 264/DIG. 1; 264/333

(58) Field of Classification Search .................. 106/705; 264/DIG. 1, 333
See application file for complete search history.

(56) References Cited

U.S. PATENT DOCUMENTS

| | | | |
|---|---|---|---|
| 1,895,159 A | | 1/1933 | Greenawalt |
| 2,946,112 A | * | 7/1960 | Tucker, Jr. et al. ....... 156/89.11 |
| 2,948,948 A | * | 8/1960 | Duplin, Jr. et al. ............ 264/43 |
| 3,030,222 A | | 4/1962 | Eichenlaub |
| 3,374,101 A | | 3/1968 | Ban |
| 3,573,940 A | | 4/1971 | Cockrell et al. |
| 3,600,476 A | | 8/1971 | Suzuki et al. |
| 3,679,445 A | * | 7/1972 | Howe ......................... 106/646 |
| 3,846,366 A | | 11/1974 | Wallace |
| 3,877,920 A | | 4/1975 | Carlberg |
| 3,954,390 A | | 5/1976 | Akhundov et al. |
| 3,961,973 A | * | 6/1976 | Jones ......................... 106/679 |
| 3,973,973 A | | 8/1976 | Leach |

(Continued)

FOREIGN PATENT DOCUMENTS

CN 1227207 A 9/1999

(Continued)

OTHER PUBLICATIONS

De Casa, G., Mangialardi, T., and Piga, L., "Production of Artificial Aggregates From Ceramic Processing of Municipal Incinerator Fly Ash", Waste Management and the Environment II, 2004, pp. 45-54, WIT Press, U.K.

(Continued)

*Primary Examiner*—Patricia L Hailey
(74) *Attorney, Agent, or Firm*—Brandon N. Sklar, Esq.; Kaye Scholer LLP

(57) ABSTRACT

In accordance with an embodiment, a method for producing an aggregate is disclosed comprising mixing incinerator bottom ash ("IBA") from a municipal solid waste incinerator and pulverized fuel ash ("PFA") from coal combustion. The method further comprises agglomerating the mixture, such as by pelletizing, and pyroprocessing the agglomerates, such as by sintering or vitrification, to form the aggregate. The addition of PFA to IBA has been found to facilitate production of lightweight and normal weight aggregates. Preferably, the IBA or the mixture of IBA and PFA is wet milled prior to agglomerating. A preferred proportion of IBA to PFA is 40%/60%. The agglomerates may be coated with an inorganic material to create a surface layer on the aggregate. Organic material may be included in the mixture to increase the porosity of the aggregate. A lightweight sintered aggregate comprising IBA and PFA and an aggregate comprising IBA and PFA are also disclosed.

26 Claims, 13 Drawing Sheets

U.S. PATENT DOCUMENTS

| | | | |
|---|---|---|---|
| 4,028,130 A | 6/1977 | Webster et al. | |
| 4,038,025 A | 7/1977 | Kratochvil | |
| 4,057,605 A | 11/1977 | Chauvin | |
| 4,081,285 A | 3/1978 | Pennell | |
| 4,120,735 A | 10/1978 | Smith | |
| 4,168,951 A | 9/1979 | Drugge | |
| 4,198,224 A | 4/1980 | Kirkpatrick | |
| 4,226,630 A | 10/1980 | Styron | |
| 4,255,131 A | 3/1981 | Johnson, Jr. | |
| 4,274,825 A | 6/1981 | North | |
| 4,289,479 A | 9/1981 | Johnson, Jr. | |
| 4,342,554 A | 8/1982 | Rohrbach | |
| 4,343,751 A | 8/1982 | Kumar | |
| 4,356,030 A | 10/1982 | Halpin et al. | |
| 4,377,414 A | 3/1983 | Buschmann et al. | |
| 4,432,666 A | 2/1984 | Frey et al. | |
| 4,624,711 A | 11/1986 | Styron | |
| 4,741,782 A | 5/1988 | Styron | |
| 4,770,831 A | 9/1988 | Walker | |
| 4,780,144 A | 10/1988 | Loggers | |
| 4,781,842 A | 11/1988 | Nicholson | |
| 4,781,944 A | 11/1988 | Jones | |
| 4,804,147 A * | 2/1989 | Hooper | 241/3 |
| 4,874,153 A | 10/1989 | Hashimoto et al. | |
| 4,882,067 A | 11/1989 | Johnson et al. | |
| 4,902,431 A | 2/1990 | Nicholson et al. | |
| 4,984,983 A | 1/1991 | Enkegaard | |
| 4,993,331 A | 2/1991 | White et al. | |
| 5,018,459 A | 5/1991 | Judd | |
| 5,057,009 A | 10/1991 | Nechvatal et al. | |
| 5,175,134 A | 12/1992 | Kaneko et al. | |
| 5,246,599 A | 9/1993 | Aicher | |
| 5,265,545 A | 11/1993 | Milner | |
| 5,268,028 A | 12/1993 | Fifield | |
| 5,268,131 A | 12/1993 | Harrison | |
| 5,277,826 A | 1/1994 | Burns et al. | |
| 5,342,442 A | 8/1994 | Nechvatal et al. | |
| RE34,775 E | 11/1994 | Nechvatal et al. | |
| 5,362,319 A * | 11/1994 | Johnson | 106/705 |
| 5,482,458 A | 1/1996 | Kyffin | |
| 5,500,044 A | 3/1996 | Meade et al. | |
| RE35,219 E | 4/1996 | Kent | |
| 5,583,079 A | 12/1996 | Golitz et al. | |
| 5,595,480 A | 1/1997 | Wang | |
| 5,669,969 A | 9/1997 | Meade et al. | |
| 5,678,235 A | 10/1997 | Crowe | |
| 5,704,972 A | 1/1998 | Ivkovich | |
| 5,772,751 A | 6/1998 | Nisnevich et al. | |
| 5,772,937 A | 6/1998 | Cohen et al. | |
| 5,797,496 A | 8/1998 | Kirchen et al. | |
| 5,935,885 A | 8/1999 | Hnat et al. | |
| 6,084,146 A | 7/2000 | Barkatt et al. | |
| 6,105,517 A | 8/2000 | Swithenbank | |
| 6,183,242 B1 | 2/2001 | Heian | |
| 6,288,300 B1 | 9/2001 | Lemus et al. | |
| 6,342,461 B1 | 1/2002 | Lee et al. | |
| 6,440,884 B1 | 8/2002 | Devagnanam | |
| 6,468,074 B1 | 10/2002 | Wu | |
| 6,528,547 B2 * | 3/2003 | Shulman | 106/679 |
| 6,627,083 B2 | 9/2003 | Rennesund et al. | |
| 6,755,905 B2 | 6/2004 | Oates et al. | |
| 6,818,055 B2 | 11/2004 | Schelinski | |
| 6,887,389 B2 | 5/2005 | Judd | |
| 2003/0047114 A1 | 3/2003 | Kayali et al. | |
| 2003/0148879 A1 | 8/2003 | Beaumont et al. | |
| 2004/0217505 A1 | 11/2004 | Singh | |
| 2005/0130828 A1 | 6/2005 | Ohono et al. | |
| 2006/0162619 A1 | 7/2006 | Bethani | |
| 2006/0213397 A1 | 9/2006 | Bethani | |

FOREIGN PATENT DOCUMENTS

| | | | |
|---|---|---|---|
| DE | 4006826 | | 9/1991 |
| EP | 0 034 389 A1 | | 8/1981 |
| GB | 942620 B1 | | 11/1963 |
| GB | 2189250 A | * | 10/1987 |
| GB | 2 218 412 A | | 11/1989 |
| GB | 2 273 095 A | | 8/1994 |
| GB | 2292940 A | | 3/1996 |
| JP | 8-12413 A | | 1/1996 |
| JP | 9-30857 A1 | | 2/1997 |
| JP | 9-156998 A1 | | 6/1997 |
| JP | 2002003248 | | 1/2002 |
| KR | 10-0562169 | * | 3/2006 |
| WO | WO 97/09283 | | 3/1997 |
| WO | WO 03/059820 A1 | | 7/2003 |
| WO | WO 2006074944 A1 | * | 7/2006 |
| WO | WO 2006074946 A2 | * | 7/2006 |

OTHER PUBLICATIONS

Bethanis, S.; and Cheeseman C.R., "Production of Lightweight Aggregate from Incinerator Bottom Ash and Pulverised Fuel Ash", Ecology and the Environment, 2004, pp. 55-64, vol. 78, WIT Press, U.K.

Database WPI Section Ch, Week 198819 Derwent Publication Ltd., London, GB; AN 1982-27042E XP002348463 & JP 63 017791 B (Nitsubishi Heavy IND KK) Apr. 15, 1988.

Database WPI Section Ch, Week 200381 Derwent Publication Ltd., London, GB; AN 2003-873723 XP002348464 & KR 2003 061 177 A (JO B W) Jul. 18, 2003.

Dialog Abstract for JP 10 029841 A (Sumitomo Metal Mining Co Ltd), Feb. 3, 1998.

Ries, J.P. and Holm, T.A., "A Holistic Approach to Sustainability For the Concrete Community—Lightweight Concrete-Two Millennia of Proven Performance", Information Sheet 7700.1, Apr. 2004, ESCSI, Salt Lake City, Utah.

Wainwright, P.J., "Artificial Aggregate From Domestic Refuse", Concrete, May 1981, pp. 25-29, 15(5), U.K.

Huang, W. and Chu, S., "A Study on the Cementlike Properties of Municipal Waste Incineration Ashes", Cement and Concrete Research, vol. 33, pp. 1795-1799, Elsevier Ltd., Oxford, U.K.

Barbieri, L.; Corradi, A.; and Lancellotti, I., "Bulk and Sintered Glass-Ceramics By Recycling Municipal Incinerator Bottom Ash", Journal of the European Ceramic Society, vol. 20, 2000, pp. 1637-1643, Elsevier Science Ltd., Oxford, U.K.

Cheeseman, C.R.; Monteiro Da Rocha, S.; Sollars, C.; Bethanis, S.; and Boccaccini, A.R., "Ceramic Processing of Incinerator Bottom Ash", Waste Management 23 (2003), pp. 907-916, Elsevier Ltd., Oxford, U.K.

Forteza, R.; Far, M.; Segui, C.; and Cerda, V., "Characterization of Bottom Ash in Municipal Solid Waste Incinerators For Its Use in Road Base", Waste Management 24 (2004), pp. 899-909, Elsevier Ltd., Oxford, U.K.

Souza, G.P.; Filgueira, M.; Rosenthal, R. et al., "Characterization of natural diatomaceous composite material", Ceramica, Jan./Mar. 2003,, vol. 49, No. 309, pp. 40-43, Sao Paulo, Brazil. (with English Language Abstract).

Santos, R.S.; Souza, G.P.; and Holanda, J.N.F., "Characterization of Waste of Petroleum Industry Containing Clayey Masses and Its Application in Structural Ceramics", Ceramica, Jul./Sep. vol. 48 No. 307 2002, pp. 115-120, Sao Paulo, Brazil. (with English Language Abstract).

Derman, J.D.; Schlieper, H.A., "Decontamination and Beneficial Reuse of Dredged Material Using Existing Infrastructure for the Manufacture of Lightweight Aggregate", Presented at 19th Western Dredging Association (WEDA XIX) Annual Meeting and Conference and 31st Texas A&M University Dredging Seminar (TAMU 31), May 15-20, 1999, Louisville, Kentucky.

Barbieri, Luisa, et al., "Design, Obtainment and Properties of Glasses and Glass-Ceramics From Coal Fly Ash", Fuel, 1999, vol. 78, pp. 271-276, Elsevier Science Ltd., Oxford, U.K.

Ghosh, S.; Das, Mihir; Chakrabarti, S.and Ghatak, S., "Development of Ceramic Tiles from Common Clay and Blast Furnace Slag", Ceramics International, 2002, vol. 28, pp. 393-400, Elsevier Science Ltd., Oxford, U.K.

Cheng, T.W., "Effect of Additional Materials On the Properties of Glass-Ceramic Produced From Incinerator Fly Ashes", Chemosphere, vol. 56, 2004, pp. 127-131, Elsevier Ltd., Oxford, U.K.

Pinto, M.F.; Sousa, S.J.G.; and Holanda, J.N.F., "Effect of Firing Cycle on the Technological Properties of a Red Wall Tile Paste", Ceramica, Jul./Sep. 2005, vol. 51, No. 319, pp. 225-229, Sao Paulo, Brazil. (with English Language Abstract).

Bethanis, B.; Cheeseman, C.and Sollars, C., "Effect of Sintering Temperature on the Properties and Leaching of Incinerator Bottom Ash", Waste Management & Research, vol. 22, 2004, pp. 255-264, International Solid Waste Association, U.K.

Dana, K.; Das, S.and Das, S.K., "Effect of Substitution of Fly Ash for Quartz in Triaxial Kaolin-Quartz-Feldspar System", Journal of the European Ceramic Society, 2004, vol. 24, pp. 3169-3175, Elsevier Ltd., Oxford, U.K.

Basegio, T.; Berutti, F.; Bernardes, A. and Bergmann, C.P., " Environmental and Technical Aspects of the Utilisation of Tannery Sludge as a Raw Material for Clay Products", Journal of the European Ceramic Society, 2002, vol. 22, pp. 2251-2259, Elsevier Science Ltd., Oxford, U.K.

Sousa, S.J.G.; and Holanda, J.N.F., "Evaluation of Physical-Mechanical Properties of a Ceramic Paste for Porous Wall Tile (BIII)", Ceramica, Jan./Mar. 2005, vol. 51 No. 317, pp. 70-76, Sao Paulo, Brazil. (with English Language Abstract).

"Furnace Bottom Ash (FBA) in Light Weight Aggregate (LWA) Concrete Blocks", Technical Data Sheet, http://www.ukqaa.org.uk/Datasheets_PDF/Datasheet_7-0_Aug_2004.pdf, Aug. 2004, United Kingdom Quality Ash Association, U.K.

"Incinerator Bottom Ash", http://web.archive.org/web/20050315073113/http://www.hanson.co.uk/Products-Services/Aggregates/Recycled/iba/, Hanson, U.K. (at least as early as Jul. 15, 2005).

Bethanis, S., "Incorporation of Starch in Waste Ashes and its Impact on Porosity Formation of Ceramics", Proceedings of the 20th International Conference on Solid Waste Technology and Management, Apr. 3-6, 2005, Philadelphia, PA.

"Lightweight Aggregate" http://www.epa.gov/epaoswer/other/mining/minedock/id/id4-Iwa.pdf, Environmental Protection Agency, U.S. (undated).

Show, K.Y., Lee, D.J., Tay, J.H., Hong, S.Y., and Chien, C.Y., "Lightweight aggregates from industrial sludge-marine clay mixes." Journal of Environmental Engineering, Jul. 2005, vol. 7, pp. 1106-1113, International Solid Waste Association, Denmark.

"Lightweight Aggregates Manufactured from Pulverised Fuel Ash", http://www.ukqaa.org.uk/Datasheets_PDF/Datasheet_4-0_Aug_2003.pdf, Aug. 2004, U.K.

"Lightweight Aggregate Plant", http://www.r-s.com/projects/96WD10.htm, Roberts & Schaefer Company, Illinois, 2000, U.S.

Bethanis, S.; Cheeseman, C.R., "Manufacture of Lightweight Aggregate from Incinerator Bottom Ash and Pulverised Fuel Ash", Proceedings of the Heleco Conference, Feb. 3-6, 2005, Athens, Greece.

Bijen, J.M., "Manufacturing Processes of Artificial Lightweight Aggregates from Fly Ash", The International Journal of Cement Composites and Lightweight Concrete, Aug. 1986, vol. 8, No. 3, pp. 191-199, U.K.

Hernandez-Crespo, M.S.; and J. MA. Rincon, "New Porcelainized Stoneware Materials Obtained by Recycling of MSW Incinerator Fly Ashes and Granite Sawing Residues.", Ceramics International, 2001, vol. 27, pp. 713-720, Elsevier Science Ltd., Oxford, U.K.

Zakaria, M.; and Cabrera, J.G., " Performance and Durability of Concrete Made With Demolition Waste and Artificial Fly Ash-Clay Aggregates", Waste Managemnt, 1996, vol. 16, Nos. 1-3, pp. 151-158,Elsevier Science Ltd., Oxford, U.K.

Bethanis, S., "Production of Synthetic Aggregates from Waste Ashes", Proceedings of the 20th International Conference on Solid Waste Technology and Management, Apr. 3-6, 2005, Philadelphia, PA.

Cheeseman, C.R.; and Virdi, G.S., "Properties and Microstructure of Lightweight Aggregate Produced from Sintered Sewage Sludge Ash", Resources, Conservation, and Recycling, 2005, vol. 45, pp. 18-30, Elsevier Ltd., Oxford, U.K.

Bethanis, S.; Cheeseman C.R. and Sollars, C.J., "Properties and Microstructure of Sintered Incinerator Bottom Ash", Ceramics International, 2002, vol. 28, pp. 881-886, Elsevier Science Ltd., Oxford, U.K.

Cheeseman, C.R.; Makinde, A.; and Bethanis, S, "Properties of Lightweight Aggregate Produced by Rapid Sintering of Incinerator Bottom Ash", Resources, Conservation, and Recycling, vol. 43, 2004, pp. 147-162, Elsevier Ltd., Oxford, U.K.

Bai, Y.; Ibrahim, R.; and Basheer, P.A., "Properties of Lightweight Concrete Manufactured With Fly Ash, Furnace Bottom Ash, and Lytag", International Workshop on Sustainable Development and Concrete Technology, May 20-21, 2004, Beijing, China.

Tay, J. H.; and Show, K. Y., "Resource Recovery of Sludge as a Building and Construction Material—A Future Trend in Sludge Management", Water Science and Technology, 1997, vol. 36, No. 11, pp. 259-266, Elsevier Science Ltd., Oxford, U.K.

Wainwright, P.J.; and Cresswell, D.J.F., "Synthetic Aggregates From Combustion Ashes Using an Innovative Rotary Kiln", Waste Management, 2001, vol. 21, pp. 241-246, Elsevier Science Ltd., Oxford, U.K.

Kuennen, T., "Synthetic Aggregates Promise New Options for Engineers", Better Roads, Jun. 2005, http://obr.gcnpublishing.com/articles/jun05e.htm, James Informational Media Inc., Illinois, U.S.

Swamy, R.N.; and Lambert, G.H., "The Microstructure of Lytag Aggregate", The International Journal of Cement Composites and Lightweight Concrete, Nov. 1981, vol. 3, No. 4, pp. 273-282, Construction Press, England.

Wang, K.-S.; Tsai, C.-C.; Lin, K.-L.; and Chiang, K.Y., "The Recycling of MSW Incinerator Bottom Ash by Sintering" Waste Management & Research, vol. 21, 2003, pp. 318-329, International Solid Waste Association, Denmark.

"The Use of Incinerator Bottom Ash as Aggregate" Aggregates Advisory Service, Mar. 1999, Digest No. 065, Energy from Waste Association, Department of the Environment, London, England.

Schroeder, R.L., "The Use of Recycled Materials in Highway Construction", Public Roads, vol. 58, Autumn 1994, Federal Highway Administration, Washington D.C., U.S.

Menezes, R.R. et al., "Use of Granite Sawing Wastes in the Production of Ceramic Bricks and Tiles", Journal of the European Ceramic Society, vol. 25, May 2005, pp. 1149-1158, Elsevier Ltd., Oxford, U.K.

Barbieri, L.; Corradi, A.; Lancellotti, I.; and Manfredini, T., "Use of Municipal Incinerator Bottom Ash as Sintering Promoter in Industrial Ceramics", Waste Management, 2002, vol. 22, pp. 859-863, Elsevier Science Ltd., Oxford, U.K.

"Use of Recycled Materials and Industrial By-Products in Concrete" http://www.greenconcrete.dundee.ac.uk/ProjectOverview.htm, Jan. 2, 2005, University of Dundee, Scotland, U.K.

Segadaes, A.M.; Carvalho, M.A.; and Acchar, W., "Using Marble and Granite Rejects to Enhance the Processing of Clay Products", Applied Clay Science, 2005, pp. 42-52, Elsevier B.V., Oxford, U.K.

Baykal, G.; and Doven A.G., "Utilization of Fly Ash by Pelletization Process; Theory, Application Areas and Research Results", Resources, Conservation and Recycling, vol. 30, 2000, pp. 59-77, Elsevier Science Ltd., Oxford, U.K.

Moreira, J.M.S.; Freire, M.N.; and Holanda, J.N.F., "Utilization of Granite Sawing Waste from Espirito Santo State in Red Ceramic", Ceramica, Oct./Dec. 2003, pp. 262-267, vol. 49, No. 312, Sao Paulo, Brazil. (with English Language Abstract).

"Utilization of Lightweight Aggregates Made from Coal Gasification Slags", http://www.icci.org/99final/choudhry.htm, Illinois Clean Coal Institute, 1999, Illinois, U.S.

"Utilization of Lightweight Materials Made from Coal Gasification Slags", Quarterly Report No. 2019, http://www.osti.gov/bridge/servlets/purl/758161-Id7qbW/webviewable/758161.PDF, Sep. 1999, U.S. Department of Energy—Office of Fossil Energy, West Virginia, U.S.

Moreira, J.M.S.; Manhaes, J.P.V.T.; and Holanda, J.N.F., "Utilization of Ornamental Rock Waste from Northwest Fluminese in Red Ceramic", Ceramica, vol. 51, No. 319, Jul./Sep. 2005, pp. 180-186, Sao Paulo, Brazil. (with English Language Abstract).

Wiebusch, B.; and Seyfried, C.F., "Utilization of Sewage Sludge Ashes in the Brick and Tile Industry", Water Science and Technology, vol. 36, No. 11, 1997, pp. 251-258, Elsevier Science Ltd., Oxford, U.K.

Oliveira, G.E.; and Holanda, J.N.F., "Utilization of Solid Waste from Siderurgical Industry in Red Ceramic", Ceramica, Apr./Jun. 2004, pp. 75-80, vol. 50, No. 314, Sao Paulo, Brazil. (with English Language Abstract).

Manfred, K, "Vitrification of Waste Materials", Glass Science and Technology, vol. 70, Dec. 1997, pp. 375-381, Würzburg, Germany.

Bethani, Sophia; Thesis "Production of Lightweight Aggregates From "Energy From Waste" Combustion Ashes"; Department of Civil and Environmental Engineering, Imperial College of Science, Technology and Medicine, London, Nov. 2004.

* cited by examiner

PYROPROCESSED AGGREGATES COMPRISING IBA AND PFA AND METHODS FOR PRODUCING SUCH AGGREGATES

FIELD OF THE INVENTION

Pyroprocessed products and processes therefore, and, more particularly, pyroprocessed aggregates comprising incinerator bottom ash from municipal solid waste incinerators ("IBA") and pulverized fuel ash from coal combustion ("PFA"), and processes for making such aggregates. The aggregates may be sintered or vitrified lightweight and normal weight aggregates. Such aggregates may be used in concrete, masonry, or insulation, for example.

BACKGROUND OF THE INVENTION

Aggregates, which are essential ingredients of concrete, may be derived from natural sources with minimal processing or from naturally occurring materials that are heat treated. Aggregates may also be synthetic. Aggregates from natural sources, such as quarries, pits in ground, and riverbeds, for example, are generally composed of rock fragments, gravel, stone, and sand, which may be crushed, washed, and sized for use, as needed. Aggregates from natural materials that may be used to form aggregates include clay, shale, and slate, which are pyroprocessed, causing expansion of the material. OPTIROC and LECA are examples of commercially available expanded clay aggregates, for example. Synthetic aggregates may comprise industrial byproducts, which may be waste materials. LYTAG, for example, is a commercially available sintered aggregate comprising pulverized fuel ash ("PFA"), also known as fly ash. PFA is produced from the combustion of coal in power plants, for example.

Aggregates may be lightweight or normal weight. Lightweight aggregates ("LWAs") have a particle density of less than 2.0 $g/cm^3$ or a dry loose bulk density of less than 1.1 $g/cm^3$, as defined in ASTM specification C330. Normal weight aggregates from gravel, sand, and crushed stone, for example, have generally bulk specific gravities of from about 2.4 to about 2.9 (both oven-dry and saturated-surface-dry), and bulk densities of up to about 1.7 $g/cm^3$. High quality LWAs have a strong but low density porous ceramic core of uniform structural strength and a dense, continuous, relatively impermeable surface layer to inhibit water absorption. They are physically stable, durable, and environmentally inert. LWAs should also be nearly spherical, to improve concrete properties and provide good adherence to concrete paste. Suitable sizes for incorporation in concrete are in a range of from about 4.75 mm to about 25 mm, or 2.36 mm to 9.5 mm for coarse aggregates, in accordance with ASTM Specification C330. Smaller, fine aggregates, which are a byproduct of LWA production, may also be used, to replace sand in concrete, for example. For use in concrete, LWAs should have a sufficient crushing strength and resistance to fragmentation so that the resulting concrete has a strength of greater than 10 MPa and a dry density in a range of about 1.5 $g/cm^3$ to about 2.0 $g/cm^3$. Concrete containing LWAs ("LWA concrete") may also have a density as low as about 0.3 $g/cm^3$.

While LWA concrete may be 20-30% lighter than conventional concrete, it may be just as strong. Even when it is not as strong as conventional concrete, the LWA concrete may have reduced structural dead loads enabling the use of longer spans, narrower cross-sections, and reduced reinforcement in structures. The lower weight of the LWA concrete facilitates handling and reduces transport, equipment, and manpower costs. LWA concrete may be particularly useful in construction slabs in high rise buildings and in concrete arch bridges, for example. LWA concrete may also have improved insulating properties, freeze-thaw performance, fire resistance, and sound reduction. LWAs can also be used in the construction of other structures, in highways, and as soil fillers, for example.

Quarrying is the largest source of aggregates by volume in most countries. Despite the many advantages of LWAs, aggregate extraction is complicated by environmental and legal issues, availability, and transportation and other costs, for example.

Waste disposal is another area presenting significant environmental and legal issues. Due to the exhaustion of available landfill sites, the difficulties in acquiring new sites, the adverse environmental effects, and the costs of landfilling, disposal of waste materials has been a significant problem for many years. For example, a significant amount of incinerator bottom ash ("IBA"), which is the principal ash stream generated from municipal solid waste ("MSW") incineration, is generated and needs to be disposed of. IBA accounts for about 75% to about 80% of the total weight of MSW incinerator residues. IBA comprises a heterogeneous mixture of slag, glass, ceramics, ferrous and nonferrous metals, minerals, other non-combustibles, and unburnt organic matter. The considerable amounts of IBA produced present significant disposal problems. When landfilled, heavy metals may leach from the IBA into the ground and underground resources. IBA is currently used in its raw form (without heat treatment) in the construction of fills and embankments, pavement base and road sub-base courses, soil stabilization, landfill cover, in bricks, blocks, and paving stones, and as fillers in particular applications. Although considered a relatively inert waste, leaching of heavy metals in these applications is possible. Concrete containing IBA is weaker than concrete incorporating LYTAG, for example. The IBA may also chemically react with cement, leading to swelling and cracking.

As mentioned above, sintered LWAs comprising PFA are commercially available under the tradename LYTAG. Electricity-generating coal power plants for example, produce large amounts of PFA, which is typically collected as fine-grained particulate material from the furnace in flue gases. ASTM C 618 defines two major classes of PFA, Class F and Class C, on the basis of their chemical composition. Class F PFA, which comprises siliceous and sometimes aluminous material, is normally produced from burning anthracite or bituminous coal and has little or no cementitious value. Class C PFA, which is normally produced from the burning of subbituminous coal and lignite, usually contains significant amount of calcium hydroxide (CaOH) or lime (CaO). Class C PFA has some cementitious properties. The majority of PFA produced is currently disposed of in landfills at a great cost and risk of leakage of heavy metals that could contaminate underground aquifers.

U.S. Pat. No. 4,120,735 to Smith discloses a method of producing a brick or similarly fired construction unit, such as a ceramic-type tile or vitrified pipe, comprising mixing at least 50% by weight inorganic, non-ferrous residue from municipal incinerators (which generally refers to incinerator bottom ash) with coal fly ash and a binder, such as sodium silicate. The mixture is shaped and then fired in three steps. First, the mixture is heated at 180° C. for one hour, to ensure that moisture in the mixture is evaporated. Then the mixture is heated in increments of 65° C./minute to 550° C. and held overnight, to burn off carbon. Then the mixture is fired at temperatures of from about 1,700° F. (926° C.) to about 2,000° F. (1,093° C.), to form the brick. Smith emphasizes that the addition of the incinerator residue to the coal fly ash lowered the firing temperature as compared to a coal fly ash brick. Smith states that the incinerator residue, instead of the coal fly ash, melts to produce bonding on cooling. Considerable fusion is said to take place between 1,700° F. (926° C.) and 1,750° F. (954° C.). Smith also reports better brick properties as the proportion of incinerator residues increase. A preferred composition is 50% to 60% incinerator residue, 1% to 4% binder, and the remainder coal fly ash. Based on the low firing temperature, it is believed that the incinerator residue comprised predominantly glass and possibly incinerator fly ash. Due to the reported strengths, it is also believed that Smith produced a vitrified brick, with a large glassy, amorphous phase. The brick has high strength and low porosity, as the melted glass components of the incinerator residue filled most pores.

Avoidance of landfill disposal of wastes, such as IBA and PFA, by developing alternative, reuse applications, is needed. The economic burdens and the risks of waste disposal make it advantageous to develop alternative techniques for converting wastes into revenue-earning products that reduce the demand for less accessible, non-renewable materials.

SUMMARY OF THE INVENTION

The production of synthetic aggregates from incinerator bottom ash from municipal solid waste incinerators ("IBA") would help mitigate some the problems associated with IBA waste disposal and quarrying for aggregate materials. However, it has been found that IBA may be difficult to pyroprocess into a product having desired characteristics, because IBA sinters and densifies rapidly. IBA contains high concentrations of calcium containing minerals, such as calcium oxides, carbonates, and sulfates, as well as sodium and potassium oxides and sulfates. These minerals act as "fluxes." It is believed that the fluxes lower the melting point of the remaining compounds in the IBA, causing sintering and densification at lower temperatures than if fluxes were not present. In addition, the composition of IBA is very variable, making its pyroprocessing behavior unpredictable. Variability in IBA composition may be due to several factors, such as the incineration procedures and variability in the wastes received and processed by the MSW incinerator. The wastes received may vary based on the time of the year and the geographic location where the wastes are generated.

Pulverized fuel ash from coal combustion, also referred to as "fly ash," or "PFA" contains lower quantities of low melting point fluxes and higher quantities of high melting point minerals, than IBA. In accordance with embodiments of the present invention, PFA is mixed with IBA to facilitate the production of aggregates, such as lightweight and normal weight aggregates. Without being limited to any particular theory of operation, it is believed that PFA facilitates the production of aggregates by decreasing the amount of fluxes and increasing the amount of refractory minerals in the IBA.

In accordance with an embodiment of the invention, a method for producing an aggregate is disclosed comprising mixing incinerator bottom ash ("IBA") from a municipal solid waste incinerator and pulverized fuel ash ("PFA") from coal combustion. The method further comprises agglomerating the mixture to form an agglomerate and pyroprocessing the agglomerate to form an aggregate. The PFA may be Class F PFA. The method may further comprise milling the IBA, preferably by wet milling prior to mixing. The mixture of the IBA and the PFA may also be milled, such as by wet milling, prior to agglomerating. The agglomerating may comprise pelletizing. After wet milling, the water may be removed and used during pelletizing and/or quenching of the pyroprocessed aggregate. The agglomerate may have a diameter of from about 3 mm to about 40 mm, for example. The method may further comprise coating the agglomerates with an inorganic powder. The inorganic powder may be PFA or clay, for example.

The agglomerates are preferably pyroprocessed in a rotary kiln. The aggregate may be a lightweight aggregate or a normal weight aggregate. The aggregates may be pyroprocessed to form a sintered or a vitrified aggregate.

The IBA and the PFA may be mixed with an organic material, such as activated carbon waste, to increase the porosity of the aggregate. Up to about 30% by dry weight of the mixture of IBA and the PFA may be organic material, for example.

The method may further comprise controlling selected properties of the aggregate, such as density and water absorption, based, at least in part, on a proportion of the IBA to the PFA and the pyroprocessing temperature. The method may further comprise controlling selected properties of the aggregate, such as density, based, at least in part, by the addition of the organic material.

The method may further comprise mixing from about 5% to about 95% IBA by dry weight of the mixture with from about 95% to about 5% PFA by dry weight of the mixture. Preferably, about 30% to about 70% IBA by dry weight of the mixture is mixed with from about 70% to about 30% PFA by dry weight of the mixture. More preferably, about 30% to about 50% IBA by dry weight of the mixture is mixed with from about 70% to about 50% PFA by dry weight of the mixture.

In accordance with another embodiment of the invention, a method for producing a sintered lightweight aggregate is disclosed comprising preparing a mixture comprising IBA and PFA, agglomerating the mixture to form an agglomerate, and sintering the agglomerate. The method may further comprise sintering the agglomerate to form an aggregate having a relative density of less than about 2.0 g/cm$^3$. The lightweight aggregate may have a water absorption less than about 40% by dry weight. The agglomerate is preferably sintered in a rotary kiln.

The method may further comprise mixing a predetermined proportion of IBA to PFA and sintering the agglomerate at a temperature based, at least in part, on the predetermined proportion, to form a lightweight aggregate having a predetermined density. Mixing about 40% IBA by dry weight of the mixture with about 60% PFA by weight of the mixture is preferred. This embodiment may include mixtures at the proportions described above, as well. The method may further comprise pyroprocessing the mixture at a temperature in a range of from about 1,050° C. to about 1,170° C. The method of this embodiment may further comprise the other actions described in the first embodiment.

In accordance with another embodiment of the invention, a lightweight sintered aggregate is formed by a process comprising mixing IBA and PFA, agglomerating the mixture to form an agglomerate, and sintering the agglomerate.

In accordance with another embodiment of the invention, a lightweight sintered aggregate is disclosed comprising IBA and PFA. A mixture of the IBA and the PFA is sintered at a temperature to form the sintered lightweight aggregate. The PFA may comprise Class F PFA. The IBA may comprise from about 5% to about 95% by dry weight of the mixture and the PFA may comprise from about 95% to about 5% by dry weight of the mixture. Preferably the IBA comprises from about 30% to about 70% by dry weight of the mixture and the PFA comprises from about 70% to about 30% by dry weight of the mixture. More preferably, the IBA comprises from about 30% to about 50% by dry weight of the mixture and the PFA comprises from about 70% to about 50% by dry weight of the mixture. Most preferably, the IBA comprises about 40% by dry weight of the mixture and the PFA comprises about 60% by dry weight of the mixture. The lightweight sintered aggregate of this embodiment may have a water absorption of less than about 40%. It may also be chemically inert.

In accordance with another embodiment, an aggregate is disclosed comprising IBA and PFA. The aggregate may comprise a pyroprocessed pellet comprising a mixture of the IBA and the PFA. The pyroprocessed pellet may have a diameter of from about 2 mm to about 30 mm. The pellet may be sintered or vitrified. The aggregate may be lightweight or normal weight.

Embodiments of the invention may provide substantial economic and environmental benefits by reducing the dependence of IBA and PFA, as well as activated carbon waste, on landfill disposal, and providing an alternative to the depletion of natural resources in the search for aggregate raw materials.

DETAILED DESCRIPTION OF THE PREFERRED EMBODIMENTS

Figure 1:
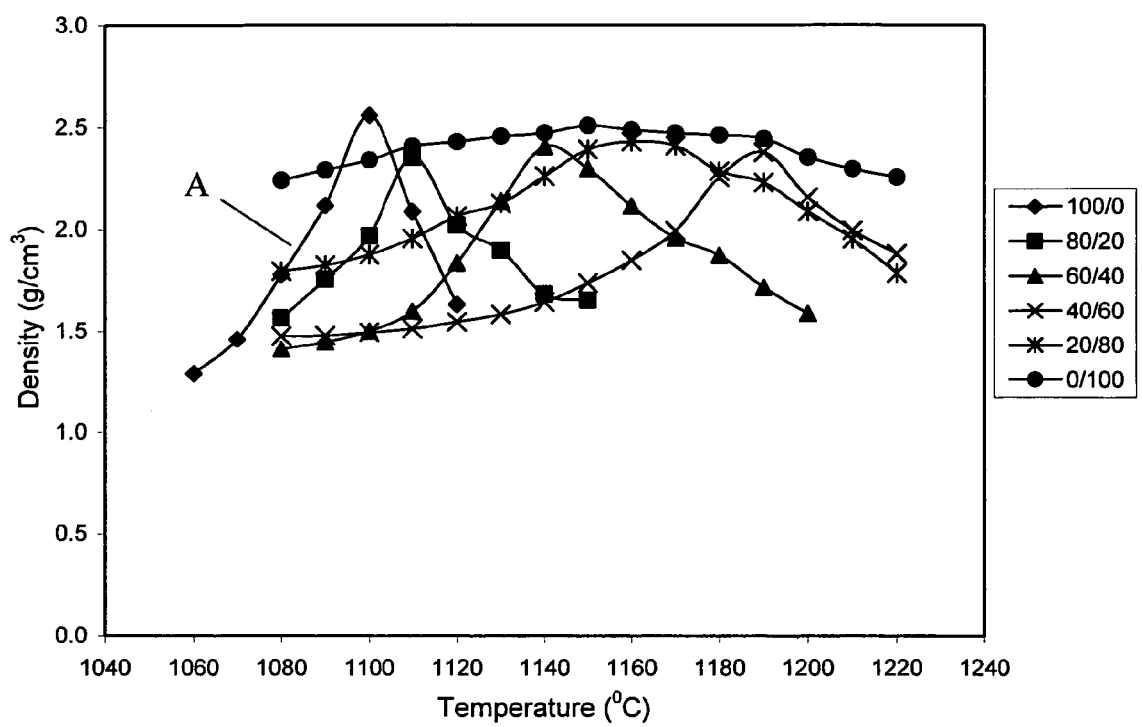
FIG. 1 is a graph of density ($g/cm^3$) versus pyroprocessing temperature (° C.) for aggregates comprising IBA, aggregates comprising mixtures of IBA and PFA, and aggregates comprising PFA alone, over a range of about 1,060° C. to about 1,220° C.

In accordance with embodiments of the invention, PFA is added to IBA to improve the densification behavior of IBA with temperature, despite the high flux components and variations in the composition of IBA, enabling better control over the aggregate production process. FIG. 1 is a graph of density ($g/cm^3$) versus pyroprocesing temperature (° C.) for aggregates comprising IBA, aggregates comprising mixtures of IBA and PFA, and aggregates comprising PFA alone, over a range of about 1,060° C. to about 1,220° C. Curve A, corresponding to 100% IBA, shows that as temperature increases from about 1,060° C. to about 1,100° C., density increases from a low of about 1.3 $g/cm^3$ to a maximum density of about 2.6 $g/cm^3$. As temperature increases from 1,100° C. to 1,120° C., density decreases from the maximum density of 2.6 $g/cm^3$ to 1.6 $g/cm^3$. Aggregates with densities of 2.0 $g/cm^3$ and below are referred to as lightweight aggregates while aggregates with densities above 2.0 $g/cm^3$ are referred to as normal weight aggregates.

Density increases with temperature from 1,060° C. to 1,100° C. because in this temperature range, as the product sinters, the fluxing agents in the IBA melt to form a liquid phase that fills pores between particles in the IBA through capillary action. Density increases as pores are filled and the volume of the sample decreases. In addition, smaller particles in the liquid phase diffuse toward the larger particles. The melted materials form a rigid, glassy, amorphous skeleton or matrix upon hardening. As the processing temperature increases, more of the compounds in the IBA melt, substantially eliminating all the pores and forming a larger glassy, crystalline solid matrix. At the temperature of maximum densification, essentially all of the pores in the sample are filled and the product is vitrified.

Density decreases with temperature from 1,100° C. to 1,120° C. because further temperature increases result in sample melting and bloating. Bloating is caused by the entrapment of gases in the melted liquid phase, resulting from volatilization of certain components of the sample. The entrapped gases form pores.

As shown in FIG. 1, IBA sinters rapidly over a very narrow temperature range. For example, in order to produce a sintered lightweight aggregate comprising 100% IBA having a density in a range of about 1.5 $g/cm^3$ to about 1.8 $g/cm^3$, the sintering temperature must be within a range of from about 1,070° C. to about 1,080° C., which is only 10° C. wide. This is believed to be caused by the presence of high amounts of fluxing agents. In addition, as mentioned above, variations in the composition of a given sample of IBA cause significant variations in the behavior of different IBA samples during heating. The relationship between temperature and density for different IBA samples may therefore vary widely. Consequently, it is very difficult to achieve an IBA end product having desired characteristics of density, porosity, water absorption, etc. The inability to control the densification behavior of IBA with temperature is a significant obstacle in the production of aggregates of required properties in large-scale production.

PFA comprises more refractory minerals, such as silica and alumina, and more particularly quartz and mullite, and lesser amounts of fluxing agents, such as calcium, magnesium, potassium, and sodium oxides, than IBA. It has been found that mixing IBA with PFA in specific proportions modifies the rapid densification behavior of IBA in a predictable manner, resulting in a broader temperature interval between the initial softening, sintering, and melting of the material sample by changing the chemical composition and mineralogy of the material. Since refractory minerals in the PFA sinter and melt at higher temperatures due to their higher melting points than the fluxing agents in the IBA, as the amount of PFA added to the IBA increases, the mixture sinters and melts at higher temperatures.

As shown in FIG. 1, in a 60%/40% IBA/PFA mix, for example, in order to produce a sintered lightweight aggregate having a density of from about 1.5 $g/cm^3$ to about 1.8 $g/cm^3$, the sintering temperature may be within a range of about 20°

(about 1,100° C. to about 1,120° C.). In a 40%/60% IBA/PFA mix, similar densities may be achieved at a sintering temperature within a 50° C. range of from 1,100° C.-1,150° C. In addition, increasing the PFA concentration to 60% delays sintering as the maximum density is reached at about 1,190° C. (in contrast to 1,100° C. for 100% IBA and 1,140° C. for 60%/40% IBA/PFA). Further increases in PFA to 80% PFA and above result in lightweight aggregates having densities of about 1.8 g/cm$^3$ to about 2.0 g/cm$^3$ in a temperature range of from about 1,080° C. to 1,1200° C. The broader temperature ranges facilitate production of aggregates of desired density and other properties, despite variations in composition of the IBA. FIG. 1 is based on the results of Example 1, below. It is noted that the effect of addition of particular amounts of PFA on the aggregates may depend on the composition of the IBA. For example, a sample of IBA may have more and possibly less calcium containing minerals and other fluxing minerals than the IBA used here (the composition of the IBA used here is given in Example 1, below). The greater the amount of fluxing minerals in a sample of IBA, the greater the effect of the addition of PFA.

It has also been found that the effects of variations in IBA composition on characteristics of resulting aggregates may be further mitigated by wet milling the IBA. Wet milling has been found to reduce material heterogeneity and produce more homogeneous slurries that are more suitable for further processing, than other commonly used techniques.

In accordance with embodiments of the invention, an aggregate may be formed by mixing predetermined amounts of IBA and PFA, agglomerating the mixture, and pyroprocessing the agglomerate at a selected temperature. The temperature may be selected based, at least in part, on the proportion of IBA to PFA, to make a pyroprocessed aggregate having desired density and other properties, such as water absorption and/or strength, based on data such as that graphically represented in FIG. 1. Sintering is preferred. The IBA may be milled prior to sintering, to improve its particle size distribution for processing. Preferably, the PFA is also milled. The IBA and the PFA may be milled together. Wet milling is preferred. The mixture is also preferably agglomerated prior to sintering, to create agglomerates having a desired size and shape to form the sintered aggregate 20. Pelletization is a preferred agglomeration method.

Figure 2:
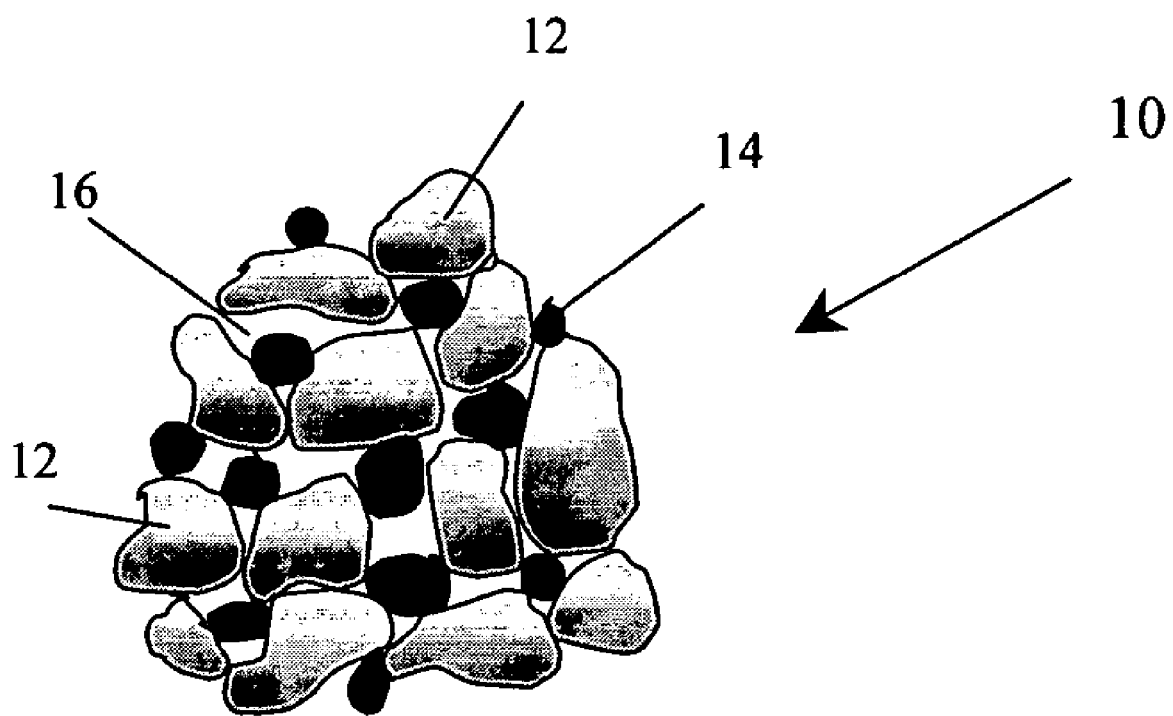
FIG. 2 is a schematic cross-sectional view of an example of an agglomerate, in accordance with an embodiment of the invention.

FIG. 2 is a schematic cross-sectional view of an example of an agglomerate 10 in accordance with an embodiment of the invention, which comprises PFA particles 12, IBA particles 14, and pores 16. During sintering, fluxing minerals, such as calcium oxide, sodium oxide, and other compounds with melting points below the processing temperature in the original grain particles of IBA 14 and PFA particles 12, melt and flow into the pores 16, as discussed above.

Figure 3:
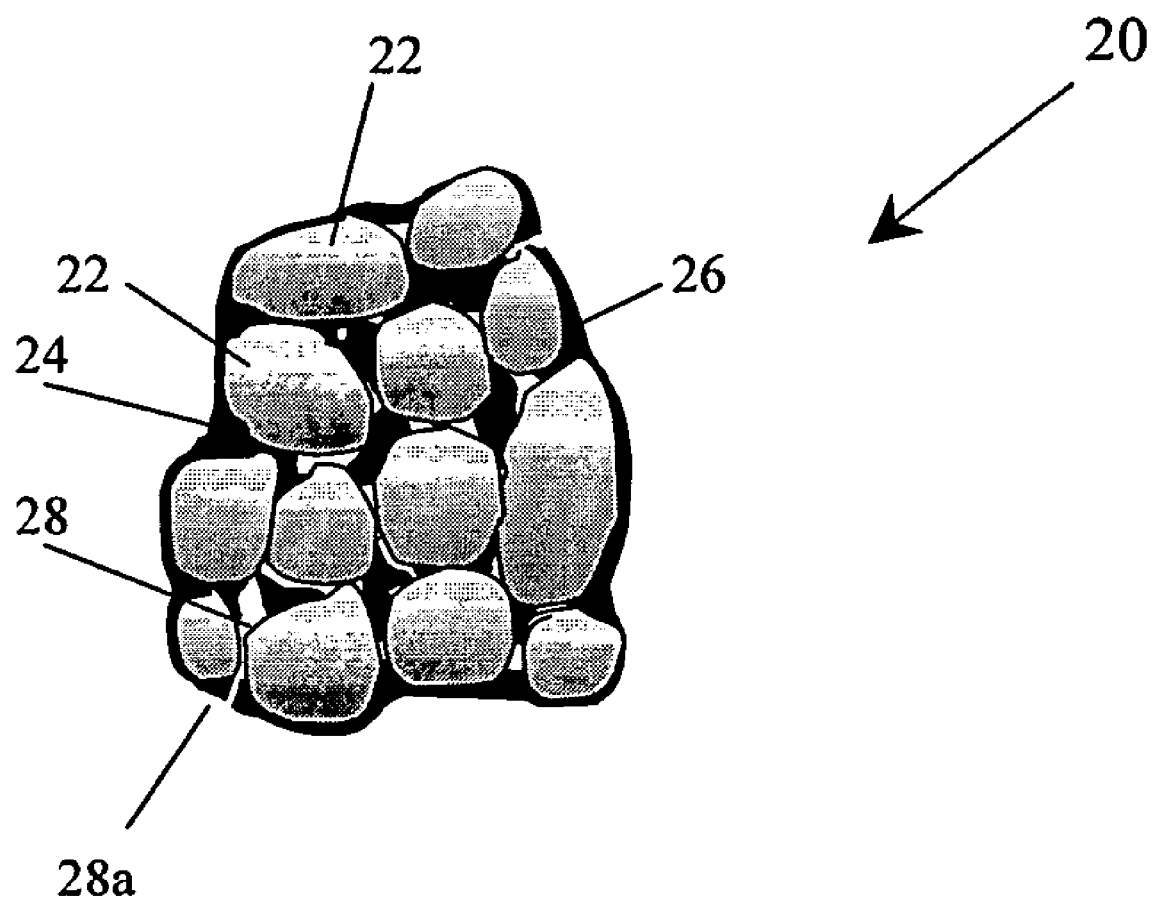
FIG. 3 is a schematic cross-sectional view of an example of an aggregate resulting from sintering the agglomerate, in accordance with an embodiment of the invention.
Figure 4:
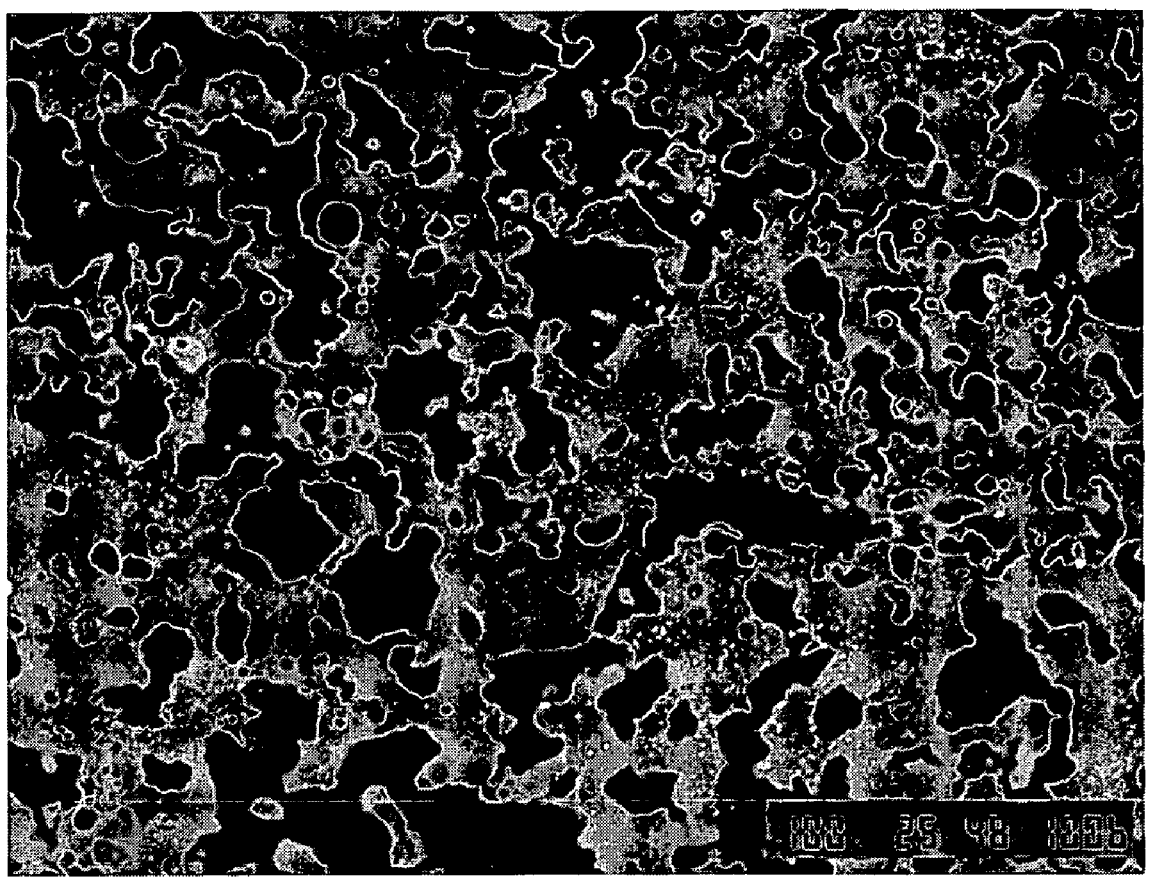
FIG. 4 is a scanning electron microscope image at a magnification of 350x, of a cross-section of a sintered aggregate, in accordance with an embodiment of the invention.

FIG. 3 is a schematic cross-sectional view of an example of an aggregate 20 resulting from sintering the agglomerate 10, in accordance with an embodiment of the invention. The aggregate 20 comprises a mixture of IBA and PFA. In this example, the agglomerate 10 is sintered at a temperature of from about 1,060° C. to about 1,220° C., depending on the proportion of IBA to PFA and the desired density and/or other characteristics. The structure of the aggregate 20 comprises a plurality of grains 22 bonded to each other through a partly glassy and partly crystallized matrix 24, resulting from the melting or crystallization of the components with temperature. The grains 22 may comprise silica, alumina, and other minerals with melting points above the processing temperature. The grains 22 fully or partially crystallize during sintering, providing an additional bond between the grains 22. The aggregate 20 preferably has a surface comprising a dense, continuous, relatively impermeable layer 26, resulting from coating of the agglomerate 10 with PFA or other inorganic material, as discussed further below. Internal pores 28, which may be channel like, and small surface pores 28a, which may be microscopic, are also present. The surface pores 28a may connect with the internal pores 28, enabling the aggregate 20 to absorb water. The degree of water absorption is indicative of the volume and connectivity of the pores of the aggregate. FIG. 4 is a scanning electron microscope image at a magnification of 350×, of a cross-section of a sintered aggregate 20, comprising 40% IBA and 60% PFA by weight, sintered at a temperature of 1,120° C., in accordance with an embodiment of the invention. Interconnected pores are shown.

Figure 5:
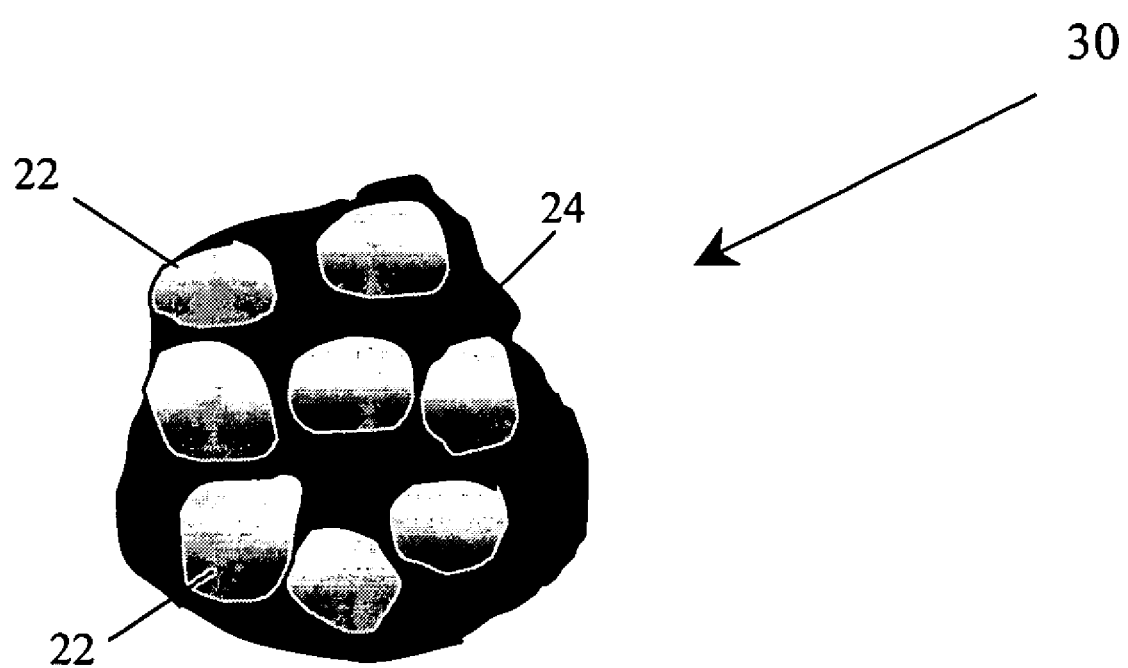
FIG. 5 is a schematic cross-sectional view of a vitrified aggregate, in accordance with another embodiment of the invention.

FIG. 5 is a schematic cross-sectional view of a vitrified aggregate 30, in accordance with another embodiment of the invention, which comprises fewer grains 22 and a larger matrix 24. Vitrification results from pyroprocessing of the agglomerate 10 at or above the temperature of maximum densification for the particular proportions of IBA to PFA, where most of the components of the agglomerate melt.

Highly porous lightweight aggregates ("LWAs") having densities as low as about 1.2 g/cm$^3$ and water absorptions above about 40%, with very low strengths, as well as very strong, well-sintered LWAs with densities up to 2.0 g/cm$^3$, may be made in accordance with embodiments of the invention. Normal weight aggregates, with densities greater than 2.0 g/cm$^3$, and up to about 2.6 g/cm$^3$, with water absorptions close to zero, may also be made in accordance with embodiments of the invention. Aggregate production with IBA and PFA in accordance with embodiments of the invention presents an advantageous reuse application.

Where the intended application requires a lower density aggregate (less than about 1.3 g/cm$^3$), with a microstructure of high porosity within a matrix 24, an organic material may be introduced into the IBA/PFA mix. The organic material may be a waste organic material, such as activated carbon waste ("ACW"), or any waste from agricultural, forestry, or industrial sources that has very high concentrations of carbon. Activated carbon results from the controlled combustion of carbonaceous material, such as wood, coal or peat. It is used as a filter in water treatment to absorb contaminants. Activated carbon waste is the spent activated carbon after it has been used. Starch may be used, as well. The organic material burns off during firing, increasing the porosity of the resultant aggregates, and decreasing their densities. Lightweight aggregates with densities as low as 0.5 g/cm$^3$ may be produced by adding organic waste. Aggregate production with IBA, PFA, and ACW presents a further advantageous reuse application for all three waste products.

Figure 6:
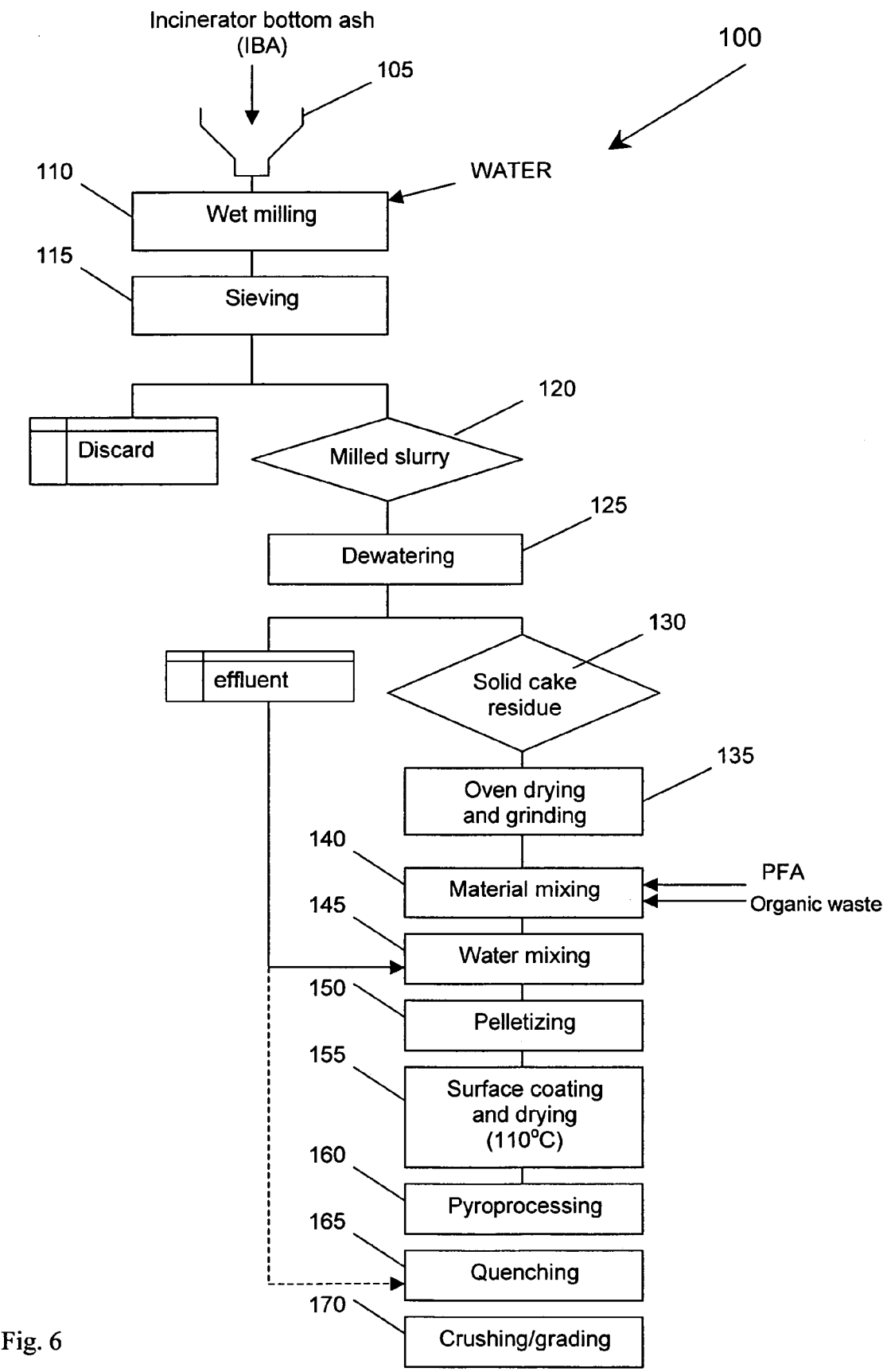
FIG. 6 is an example of a method of manufacturing aggregates, in accordance with an embodiment of the invention.

FIG. 6 is an example of a method 100 of manufacturing aggregates in accordance with an embodiment of the invention. IBA is added to a barrel of a ball mill in Step 105 and is milled with water, in Step 10. Milling is used to reduce the particle size distribution of the IBA to a distribution that is fine, to improve sinterability. Powders with fine particle size distributions have advantageous sintering characteristics because the high surface area to volume ratio increases diffusion of small particles through the liquid phase to the larger particles and because the powders are better distributed throughout the compact, with good packing densities. The resulting particles preferably have a mean particle size of about 45 microns and less, for example. Wet milling is preferred because it has been found to provide more uniform particle size distribution. In addition, the liquids used in the wet milling process tend to break up agglomerates and reduce welding of powder particles. Alternatively, the IBA may be dry milled in a hammer mill, for example.

Wet milling may take place in a closed, moving cylindrical container, for example, wherein spherical grinding media, such as aluminum spheres, in a liquid medium, such as water or alcohol, apply sufficient force to break particles suspended in the medium. Movement may be imparted to the grinding media by tumbling, vibration, planetary rotation, and/or agitation. The most important variables controlling the powder particle size distribution is the speed of milling (rpm), the milling time, the amount of grinding media, the amount of liquid, and the initial particle size of the raw material. About twice as much liquid (by weight) as IBA (by weight) is preferably provided. The milling media may be aluminum spheres that have a total weight of about four to five times that of the IBA. For efficient results, the container should be at least half filled with the grinding media. Steel spheres may be used instead of aluminum. The spheres preferably have a small diameter, such as from about 0.5 inches (12.7 mm) to about ⅝ inches (15.9 mm). Milling may take place for about 8 hours, for example.

The wet milled IBA is separated to remove large particles through a sieve, for example, in Step 115. The presence of large particles may interfere with the formation of homogenous pellets. Separation may take place in multiple steps. In one example, the IBA may be mechanically shaken in series over ASTM standard stainless steel mesh screens having openings of 3.35 mm, 1.70 mm, 355 microns, and 150 microns. The IBA fraction having particle sizes less than 355 microns is further processed.

The resulting milled slurry of the finer fraction from Step 120 is dewatered, in Step 125. Preferably, all the free water is removed. The water removed is referred to as effluent, which may be used in pelletizing Step 150 and/or in quenching Step 165, which are discussed further below. It has been found that while sodium and potassium salts leached into the effluent, heavy metals did not. The water is therefore safe to use. It is believed that the heavy metals did not leach because they were bound to low solubility carbonates and/or silicates. Water may be removed in a filter press or other filtration apparatus, for example. Dewatering results in formation of a solid moist cake residue, in Step 130.

The cake is dried and ground, in Step 135. This step converts the cake into a powder. The cake may be dried in an oven at 110° C., for example. The powder may be ground by a mortar and pestle, for example. In large-scale production, the dry solid cake may be ground to a powder in a mixer with blades or a dry hammer mill, for example.

The ground IBA powder is thoroughly mixed with PFA, in Step 140. Preferably, about 95% to about 5% PFA by dry weight is mixed with the IBA. More preferably, from about 70% to about 30% PFA by dry weight is added. More preferably, 70% to about 50% PFA by dry weight is added. Most preferably, 60% PFA by dry weight is added. Organic material, such as an organic waste, may also be added in Step 140, if desired, to increase porosity in the sintered aggregate 20. Up to about 30% by dry weight of the IBA/PFA mixture may be added. Water is then added to the mixture to achieve a clay-like consistency, which facilitates agglomeration, which is discussed in Step 145, below. The amount of water to be added is related to the amount of PFA in the mixture. If more PFA is used, more water is required. For example, if the proportion of IBA to PFA is about 60% IBA to 40% PFA, the amount of water required is about 30% by weight of the total dry weight of the IBA/PFA mixture. If the proportion is 40%/60% IBA/PFA, it has been found that about 33% of the total dry weight of the IBA/PFA mixture of water should be added. If the proportion is 20%/80% IBA/PFA, then the amount of water required is about 38% of the total dry weight of the IBA/PFA mixture. The effluent removed from the milled slurry in Step 125 may be used here.

The resulting mixture is agglomerated, in Step 150. Agglomeration is a particle size enlargement technique in which small, fine particles, such as dusts or powders, are gathered into larger masses, such as pellets. Preferably, the mixture is agglomerated by pelletization, wherein fine particles dispersed in either gas or liquid are enlarged by tumbling, without other external compacting forces. A pelletizing rotating drum or disc may be used, for example. The strength of the resulting pellets depends on the properties of the particles, the amount of moisture in the medium, and mechanical process parameters, such as the speed of rotation and angle of tilt of the rotating drum, as is known in the art. An example of the use of a rotating drum is described in the examples, below. The resulting pellets are nearly spherical or slightly angular, and vary in color from light to dark brown depending on the carbon and iron content in the mixes. In one example they range in size from about 3 mm to about 40 mm. As discussed above, FIG. 2 is an example of a pellet 10. Extrusion may also be used instead of pelletization. Extrusion results in a brick-like material that can be crushed into smaller particles after hardening. Alternatively, compaction may be used to produce cylindrical agglomerates, such as tablets or other shapes.

The agglomerated mixture is optionally surface coated and then dried, in Step 155. The pellets may be coated with an inorganic material that will not melt at the sintering temperature. The inorganic material may comprise low loss on ignition ("LOI") PFA or clay in the form of a dust, for example. Covering the pellet surface with a thin layer of non-sticking material results in formation of a skin on the pellet surface that decreases clustering of the pellets, enhances the pellet strength, and creates a thin dense outer skin 26 on the aggregate 20, as shown in FIG. 3, for example. The amount of inorganic material added may be small. The pellets may be coated by sprinkling the dust on them or rolling the pellets in the dust, for example. Drying may take place at about 110° C. in an oven, for example. Drying is preferably provided because sintering wet pellets in a kiln may result in cracking and exploding of the pellets due to rapid temperature changes.

The coated and dried pellets are pyroprocessed, in Step 160. Pyroprocessing may take place at a temperature of from about 1,000° C. to about 1,300° C., for example, depending on the composition of the mixture and the desired properties of the aggregate, as discussed in more detail, below. The pyroprocessing may be sintering, which takes place at a temperature below the temperature of maximum densification, or vitrification, which takes place at or above the temperature of maximum densification. The pyroprocessing preferably takes place in a rotary kiln. Sintering results in increased strength and density of formerly loosely bound particles, through the formation of interparticle bonds, as discussed above. Vitrification results in even higher strength at the temperature of maximum densification. As vitrification progresses at higher temperatures, however, density and strength decrease due to bloating of the material, as discussed above.

The pyroprocessed pellets may be quenched in water, in Step 165. Quenching cools the pellets, stopping the melting. If quenched, the resulting aggregate will have a more amorphous matrix 24 than when air-cooled, which allows recrystallization. It is known in the art that quenching improves the hardness, toughness and wear resistance of the pyroprocessed aggregates. The water may be at room temperature, (about 30° C.), for example. The effluent from the dewatering Step 125 may be used for quenching, if desired.

After pyroprocessing and quenching, if provided, the aggregates may be crushed and graded to different sizes, in Step 170. Due to pellet shrinkage during pyroprocessing, if the pellets ranged in size from about 3 mm to about 40 mm, the pyroprocessed aggregates may range in size from about 2 mm to about 30 mm, for example. Appropriate size ranges may be about 4 mm to about 8 mm, which may be used in filtration applications, and about 12 mm to about 19 mm, which may be used in concrete, for example. Smaller aggregates (down to about 2 mm) may also be used as fine aggregates in concrete, for example.

Figure 7:
FIG. 7 is an example of plurality of sintered aggregates, made in accordance with embodiments of the invention.

FIG. 7 is an example of plurality of sintered aggregates 40% IBA and 60% PFA, pyroprocessed at 1,100° C.-1,120° C., made in accordance with embodiments of the invention. As a result of the sintering process, the aggregates are chemically inert against most substances under normal environmental conditions, as demonstrated below.

Figure 8:
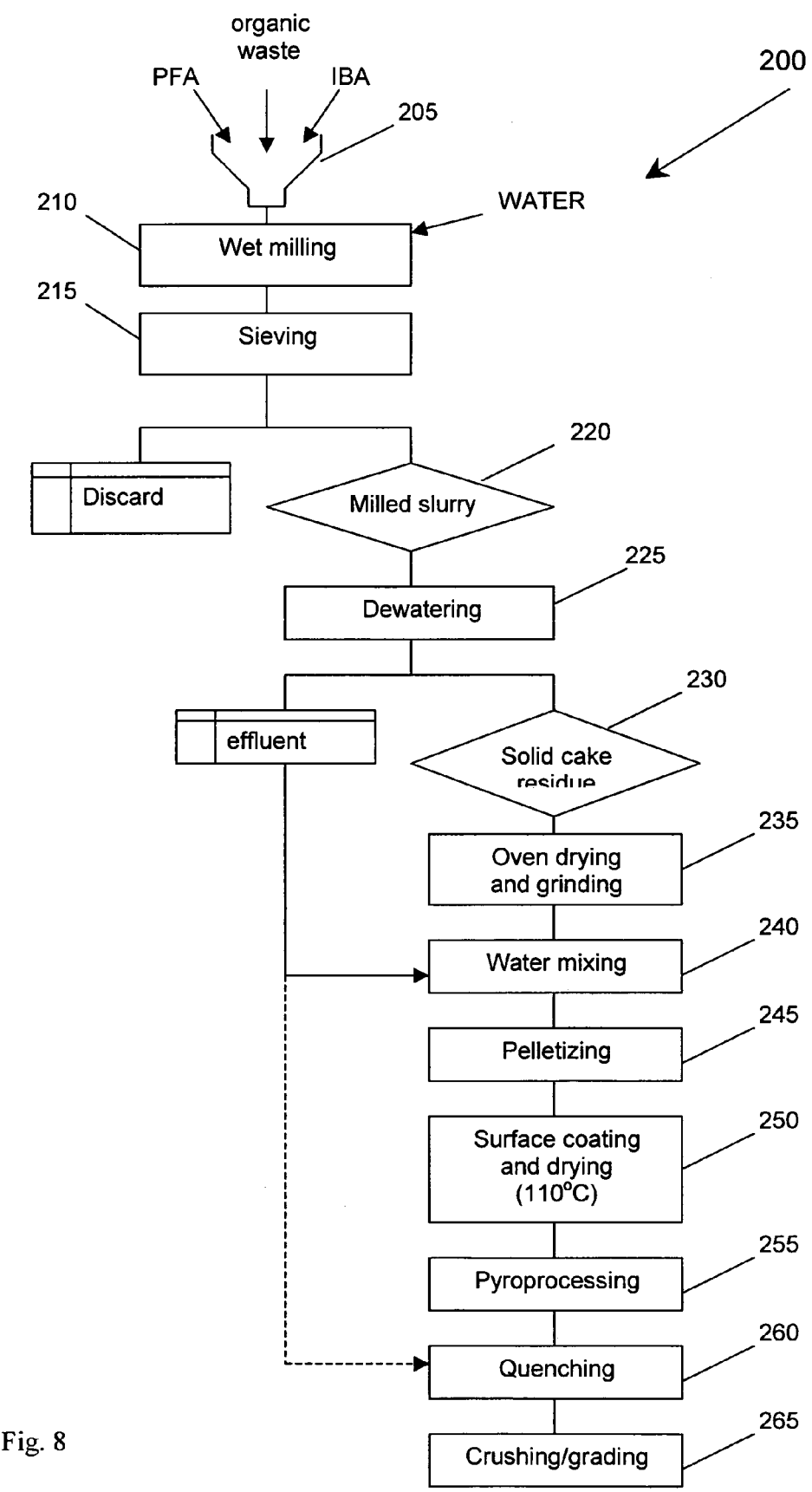
FIG. 8 is another example of a process for making aggregates, in accordance with an embodiment of the invention, in which the PFA and optionally organic material are mixed with the raw IBA, so that both materials are subjected to wet milling together.

FIG. 8 is another example of a process 200 for making aggregates in accordance with an embodiment of the invention, in which the PFA and optionally organic material are mixed with the raw IBA, so that both materials are subjected to wet milling together. The milled mixtures therefore have finer particle size distributions than the milled powders produced by the process shown in FIG. 6, where the PFA is introduced to IBA after the IBA has been milled. In Step 205, the IBA, the PFA, and optionally the organic material are added to a barrel for milling. The materials are wet milled, in Step 210. Steps 215-235 correspond to Steps 115-135 of FIG. 6 and Steps 240-265 correspond to 145-170 in FIG. 6, respectively.

If dry milling is used instead of wet milling in Steps 110 and 210 of FIGS. 6 and 8, respectively then dewatering is not necessary in Steps 125 and 225, respectively. The IBA powder produced by dry milling may be sieved through a 100 micron sieve and the resulting fraction may be oven dried. The dried fraction may then be processed in accordance with Steps 140-170 of FIG. 6 or Steps 240-265 of FIG. 8.

The following experiments have been performed:

EXAMPLE 1

Prior to receipt for processing into aggregates, the IBA is typically screened to separate large objects or strand-like materials. Ferrous metals are removed by electromagnets and non-ferrous metals are removed by eddy current separators, for example. The remaining materials are fractionated by size, which may be used for different purposes. The fraction less than about 8 mm was used in these Examples. A larger fraction could also be used, after crushing.

The average chemical analyses (major oxides) of the IBA and the PFA used in these experiments are shown in Table A, below. Table B, below, shows the minor and trace constituents present in both materials. The major crystalline phases in IBA were quartz ($SiO_2$), calcite ($CaCO_3$), and lower amounts of hematite ($Fe_2O_3$). In PFA, the major crystalline phases were quartz ($SiO_2$) and mullite ($Al_6Si_2O_{13}$). The low calcium content (<2%) and high silica, alumina, and ferric oxide content indicate that the PFA was Class F PFA.

TABLE A

| CHEMICAL ANALYSIS OF IBA & PFA | | |
|---|---|---|
| | Weight (%) | |
| Constituent | IBA | PFA |
| $SiO_2$ | 41.91 | 52.32 |
| $Al_2O_3$ | 11.09 | 26.14 |
| $Fe_2O_3$ | 5.83 | 8.61 |

TABLE A-continued

| CHEMICAL ANALYSIS OF IBA & PFA | | |
|---|---|---|
| | Weight (%) | |
| Constituent | IBA | PFA |
| CaO | 19.99 | 1.87 |
| MgO | 1.57 | 1.62 |
| $Na_2O$ | 1.80 | 1.43 |
| $K_2O$ | 1.11 | 3.77 |
| $P_2O_5$ | 1.23 | 0.28 |
| $TiO_2$ | 1.31 | 1.11 |
| MnO | 0.11 | 0.07 |
| $SO_3$ | 0.49 | 0.58 |
| Moisture | 24 | 0 |
| Loss on Ignition (LOI) | 6.63 | 2.98 |

TABLE B

| MINOR AND TRACE CONSTITUENTS IN IBA & PFA | | |
|---|---|---|
| | mg/kg | |
| Constituent | IBA | PFA |
| As | 107 | 179 |
| Ba | 1033 | 1010 |
| Cd | 44 | 5 |
| Cr | 327 | 144 |
| Cu | 717 | 212 |
| Ni | 93 | 143 |
| Pb | 815 | 144 |
| Sr | 297 | 288 |
| Zn | 3000 | 174 |

In this example, PFA was added to IBA so that both the PFA and the IBA were subjected to wet milling together, as described above with respect to FIG. 8.

Samples of 1 kg of IBA and PFA in selected proportions of 100%/0%, 80%/20%, 60%/40%, 40%/60%, 20%/80%, and 0%/100% (EBA/PFA) were wet milled at a water-to-solids ratio of 2 in a 5 liter polypropylene mill rotating at about 50 rpm using high-density alumina milling media for about 8 hours. The mill was a Model No. 21589 from Pascal Engineering Co., Ltd. The grinding media was 4.536 kg of ¾ inch (19.05 mm) high density alumina spheres. The milled slurries were passed through 3.35 mm, 1.70 mm, 355 microns, and 150 micron sieves to remove coarse particles unsuitable for sintering. The particle size distributions of the milled slurries passing the 355 micron sieve were analyzed using a laser diffraction analyzer.

Table C below, indicates the substantial particle size reduction of as-received IBA and PFA by wet milling. Ninety-five percent of the volume ($d_{95}$ value) of the as-received IBA comprised particles finer than 759 microns. This decreased to a $d_{95}$ of 23 microns after 8 hours of milling. The corresponding $d_{95}$ value for as-received PFA was 196 microns before wet milling and 30 microns after wet milling for 8 hours. Longer milling times produced finer and more uniform particle size distributions. It has been found that the resulting sintered aggregates had higher density and strength, and lower water absorption than aggregates made from mixtures milled for shorter milling periods and having coarser distributions.

TABLE C

PARTICLE SIZE DISTRIBUTION OF AS-RECEIVED AND MILLED IBA, PFA

| | Size (microns) | | | |
|---|---|---|---|---|
| Volume % < | as-received IBA | milled IBA | as-received PFA | milled PFA |
| 95 | 759.2 | 23.1 | 196.1 | 29.9 |
| 70 | 441.6 | 9.3 | 123.4 | 12.3 |
| 50 | 298.0 | 5.6 | 99.3 | 8.2 |
| 25 | 120.1 | 2.2 | 74.5 | 3.4 |
| 10 | 23.3 | 1.1 | 56.6 | 1.5 |

The fraction less than 355 microns was de-watered by pressure filtration in a stainless steel extraction vessel using Whatman GF/C filter paper, forming filter cakes. The filter cakes were oven-dried overnight at 110° C. and ground with a mortar and pestle to produce a fine, homogeneous powder. The ground powder mixes of IBA and PFA were mixed with water (up to about 45% by total dry weight of the resulting mixture) in a batch mixer and then fed to a rotary drum pelletizer having a 40 cm diameter and a 1 meter length rotating at about 17 rpm at an angle of 30° to the horizontal. The resulting "green" pellets were generally spherical or slightly angular. They had a diameter of from about 4 mm to about 19 mm (for ASTM mesh size). The pellets less than 4 mm were returned to the drum for pelletizing, while the pellets greater than 19 mm were broken down into smaller pellets by hand and returned to the pelletizer.

The pellets were then coated with PFA powder, by sprinkling the PFA powder onto them. The pellets were then dried at about 110° C. and fed to a rotary kiln having a 77 mm internal diameter by 1500 mm length, in which the heated zone was 900 mm long. The kiln was set to run at temperatures between about 1,080° C. and about 1,220° C. for the different IBA with PFA mixes. The pellets traveled and rotated along a tube of the rotary kiln, at a speed of about 2.8 rpm for about 10 minutes to about 12 minutes. In this example, the kiln was an electric fired rotary furnace available from Carbolite Hope Valley, England, Model No. GTF R195. The sintered product was discharged from the kiln and was allowed to cool at room temperature. It is noted that the temperature versus density curves may vary in each kiln. For example, the curves corresponding to particular proportions of IBA and PFA may have the maximum densification temperature at slightly lower or higher temperatures than those using the specific kiln identified above. This curve shifting may be attributed to the operational efficiency of a particular kiln, such as the stability of temperature profile, energy losses, etc. It may therefore be necessary to prepare a general sample in a particular kiln being used to identify the temperature range over which the aggregate will have the desired characteristics.

Results

Tables D-E, below, summarize the physical and mechanical properties of aggregates formed by the process of Example 1. It is noted that the aggregates showed substantial changes in their physical properties with increasing concentrations of PFA in the IBA/PFA mixes.

Table D below, shows the effect of the addition of PFA on density and water absorption capacities of aggregates comprising different proportions of IBA to PFA, pyroprocessed at different temperature ranges (in 10 centigrade degree increments). The relative dry densities of the pyroprocessed aggregates were calculated using Archimedes' method and the water absorptions were determined from the increase in weight of "surface dry" aggregates after being submerged in water for 24 hours. High water absorption values indicate that the structure is porous and open to the absorption of water due to microscopic surface pores that connect to internal pores in the aggregate, discussed above. The data presented is an average of 7 values for the 100% IBA and an average of 2 values for all samples containing PFA. The density versus temperature data is plotted on the graph of FIG. 1. As discussed above, increasing the PFA concentration in the mixes resulted in a broader temperature interval between the initial softening, sintering, maximum densification (vitrification), and complete or near complete melting of the samples, due to the modification of the chemical composition and mineralogy of the IBA with increasing amounts of PFA.

As is apparent from FIG. 1 and Table D temperature may be used to determine the density and other characteristics of the sintered product, for a given combination of IBA and PFA. For example, in a 40%/60% mix of IBA/PFA, sintering at 1,100° C. will yield a LWA with a density of about 1.50 g/cm$^3$, while sintering the same mixture at 1,190° C. will yield a normal weight aggregate with a density of about 2.4 g/cm$^3$.

Table D also shows the effect of PFA addition on the water absorption capacities of the different aggregates. Aggregates produced at lower temperatures than the temperature of maximum densification typically have open, porous microstructures. As maximum densification is approached, the size and number of the pores gradually decrease to zero, as the pores are filled with melted material. Samples containing high amounts of IBA exhibit a rapid reduction in water absorption with temperature, while high PFA samples show a gradual water absorption reduction with temperature. 100% PFA samples are relatively non-porous (<5% water absorption) between 1,080° C. and 1,100° C. due to the high densities attained, while 100%/0%, 80%/20%, 60%/40% and 40%/60% IBA/PFA mixes have 30% to 40% water absorptions at 1,080° C.

Lightweight, porous aggregates, with adequate strengths, with densities less than 2.0 g/cm$^3$ (down to about 1.4 g/cm$^3$) can be made in accordance with embodiments of the invention, for use in lightweight concrete. Aggregates with relative densities above 2.0 g/cm$^3$, up to about 2.5 g/cm$^3$, that are impermeable to water ingress, with high strengths, can be made for use as replacement aggregates in conventional (normal weight) concrete.

TABLE D

PHYSICAL PROPERTIES OF IBA/PFA AGGREGATES

| Ratio (IBA/PFA) | Temperature (° C.) | Density (g/cm$^3$) | water absorption (%) |
|---|---|---|---|
| 100/0 | 1060 | 1.29 | 41.80 |
| | 1070 | 1.46 | 33.07 |
| | 1080 | 1.78 | 21.51 |
| | 1090 | 2.12 | 3.20 |
| | 1100 | 2.56 | 1.00 |
| | 1110 | 2.09 | 0.32 |
| | 1120 | 1.63 | 0.12 |
| 80/20 | 1080 | 1.57 | 29.40 |
| | 1090 | 1.76 | 19.61 |
| | 1100 | 1.97 | 13.54 |
| | 1110 | 2.35 | 3.23 |
| | 1120 | 2.02 | 0.76 |
| | 1130 | 1.90 | 0.33 |
| | 1140 | 1.68 | 0.12 |
| | 1150 | 1.66 | 0.08 |

TABLE D-continued

PHYSICAL PROPERTIES OF IBA/PFA AGGREGATES

| Ratio (IBA/PFA) | Temperature (° C.) | Density (g/cm³) | water absorption (%) |
|---|---|---|---|
| 60/40 | 1080 | 1.41 | 35.00 |
|  | 1090 | 1.45 | 30.18 |
|  | 1100 | 1.50 | 28.66 |
|  | 1110 | 1.60 | 23.16 |
|  | 1120 | 1.84 | 14.55 |
|  | 1130 | 2.14 | 7.18 |
|  | 1140 | 2.41 | 0.05 |
|  | 1150 | 2.30 | 0.05 |
|  | 1160 | 2.12 | 0.11 |
|  | 1170 | 1.96 | 0.04 |
|  | 1180 | 1.88 | 0.10 |
|  | 1190 | 1.72 | 0.01 |
|  | 1200 | 1.59 | 0.15 |
| 40/60 | 1080 | 1.48 | 28.69 |
|  | 1090 | 1.48 | 28.75 |
|  | 1100 | 1.50 | 25.98 |
|  | 1110 | 1.51 | 24.85 |
|  | 1120 | 1.55 | 23.56 |
|  | 1130 | 1.58 | 19.70 |
|  | 1140 | 1.65 | 17.10 |
|  | 1150 | 1.74 | 12.58 |
|  | 1160 | 1.85 | 7.89 |
|  | 1170 | 2.00 | 4.78 |
|  | 1180 | 2.26 | 1.92 |
|  | 1190 | 2.38 | 0.02 |
|  | 1200 | 2.16 | 0.11 |
|  | 1210 | 2.00 | 0.07 |
|  | 1220 | 1.88 | 0.09 |
| 20/80 | 1080 | 1.80 | 18.51 |
|  | 1090 | 1.83 | 15.00 |
|  | 1100 | 1.88 | 14.22 |
|  | 1110 | 1.96 | 10.67 |
|  | 1120 | 2.07 | 8.57 |
|  | 1130 | 2.13 | 6.28 |
|  | 1140 | 2.26 | 2.21 |
|  | 1150 | 2.39 | 0.34 |
|  | 1160 | 2.43 | 0.06 |
|  | 1170 | 2.41 | 0.01 |
|  | 1180 | 2.29 | 0.03 |
|  | 1190 | 2.23 | 0.01 |
|  | 1200 | 2.09 | 0.08 |
|  | 1210 | 1.96 | 0.06 |
|  | 1220 | 1.79 | 0.07 |
| 0/100 | 1080 | 2.24 | 5.25 |
|  | 1090 | 2.29 | 2.84 |
|  | 1100 | 2.34 | 2.02 |
|  | 1110 | 2.41 | 0.40 |
|  | 1120 | 2.43 | 0.27 |
|  | 1130 | 2.46 | 0.12 |
|  | 1140 | 2.47 | 0.10 |
|  | 1150 | 2.51 | 0.02 |
|  | 1160 | 2.49 | 0.06 |
|  | 1170 | 2.47 | 0.03 |
|  | 1180 | 2.46 | 0.03 |
|  | 1190 | 2.45 | 0.04 |
|  | 1200 | 2.36 | 0.07 |
|  | 1210 | 2.30 | 0.05 |
|  | 1220 | 2.26 | 0.01 |

Table E below, summarizes aggregate crushing values ("ACVs") (%) for selected mixes of IBA and PFA, at specific pyroprocessing temperatures. The ACVs are provided at three different temperatures for different proportions of IBA to PFA. ACV is inversely proportional to aggregate strength. The selected temperatures were those causing different product characteristics and different microstructures, for comparison. At the lower temperatures in each set, a sintered LWA was produced in accordance with a preferred embodiment of the invention. At the middle temperatures, a well-sintered or vitrified, normal weight aggregate with small amounts of residual pores was produced in accordance with embodiments of the present invention. At the higher temperatures, vitrified LWA was produced, also in accordance with embodiments of the invention. The higher temperatures caused the aggregate to be a LWA, due to expansion and melting of the materials, as discussed above.

ACVs were lower and the strength of the aggregates were higher at the temperature of maximum densification (middle temperature). Below that temperature, the densities were lower, the ACVs were higher, and the strengths of individual or bulk aggregates were lower. Above that temperature, the ACVs started to increase as the density and aggregate strength decreased, as a result of increased sample melting. The aggregate strengths show the same trend of pellet densities with increasing temperature, increasing to a maximum value and then decreasing, as expected. The LWAs comprising IBA and PFA in varying proportions in accordance with embodiments of the invention also have lower ACVs and higher strengths than LYTAG, which has an ACV of about 34%, as noted below.

TABLE E

AGGREGATE CRUSHING VALUE (%)

| Ratio IBA/PFA | Temper. (° C.) | ACV (%) | Temper. (° C.) | ACV (%) | Temper. (° C.) | ACV (%) |
|---|---|---|---|---|---|---|
| 100/0 | 1080 | 18.7 | 1100 | 9.3 | 1110 | 13.9 |
| 80/20 | 1090 | 19.1 | 1110 | 9.2 | 1130 | 12.9 |
| 60/40 | 1120 | 16.8 | 1140 | 7.8 | 1170 | 12.2 |
| 40/60 | 1150 | 15.9 | 1190 | 7.7 | 1220 | 12.0 |
| 20/80 | 1100 | 15.5 | 1160 | 7.5 | 1220 | 12.3 |
| 0/100 | — | — | 1120 | 8.3 | — | — |

Based on the effect of temperature and PFA addition on the properties of the sintered aggregates, summarized in Table D and in FIG. 1, a 40%/60% IBA/PFA mix, sintered at a temperature in a range of 1,080° C. to 1,220° C., having densities from about 1.4 g/cm³ to about 2.4 g/cm³ is preferred. Such aggregates may be used in a range of applications including as aggregates in concrete. This combination will sinter to form LWAs over the broadest temperature range of 90 centigrade degrees at temperatures between about 1,080° C. and about 1,170° C. The behavior of this mixture during sintering and the final properties of the resulting sintered LWAs may therefore be more easily controlled than 100% IBA and other combinations of IBA and PFA, despite variations in IBA compositions, making it easier to manufacture. In addition, less energy is required by the sintering process than in mixes with higher amounts of PFA, because lower temperatures may be used. Normal weight aggregates may also be more readily produced with higher densities and less porosity than LWAs.

Table F below, summarizes certain physical properties (relative dry densities and water absorptions from Table D and bulk densities) and mechanical properties (ACV from Table E and hardness) of aggregates from 100%/0%, 40%/60% and 0%/100% mixes of IBA/PFA at three selected temperatures. Hardness was measured by using the diamond pyramid Vickers test on aggregates embedded in epoxy resin and polished using a 0.5 micron paste, as is known in the art. Hardness is highest for aggregates sintered at the middle temperatures of maximum densification, reaching values between 2 to 4 GPa. The highest value of 3.6 was obtained for the 40%/60% mix of IBA/PFA at 1,190° C.

TABLE F

PHYSICAL AND MECHANICAL PROPERTIES OF AGGREGATES

| Raw materials | Percent | Temp. (° C.) | Relative dry density (g/cm$^3$) | Water absorption (%) | Hardness ±0.1 (GPa) | Bulk density (g/cm$^3$) | ACV (%) |
|---|---|---|---|---|---|---|---|
| 1 IBA | 100 | 1080 | 1.78 | 21.51 | 7.6 * 10$^{-3}$ | 1.11 | 18.7 |
| PFA | 0 | 1100 | 2.56 | 1.00 | 1.9 | 1.69 | 9.3 |
|  |  | 1110 | 2.09 | 0.32 | 20.1 * 10$^{-3}$ | 1.32 | 13.9 |
| 2 IBA | 40 | 1150 | 1.74 | 12.58 | 10.9 * 10$^{-3}$ | 1.16 | 15.9 |
| PFA | 60 | 1190 | 2.38 | 0.02 | 3.6 | 1.72 | 7.7 |
|  |  | 1220 | 1.88 | 0.09 | 24.3 * 10$^{-3}$ | 1.36 | 12.0 |
| 3 IBA | 0 | 1120 | 2.43 | 0.27 | 2.8 | 1.70 | 8.3 |
| PFA | 100 |  |  |  |  |  |  |

Note: The relative density is specific gravity (OD-oven dry).

The physical and mechanical properties of LWAs produced from a 40%/60% mix of IBA/PFA, sintered at 1,120° C., were determined and summarized in Table G below (where the LWAs are referred to as LWA-1), along with the corresponding properties of the commercially available LYTAG (PFA) and OPTIROC (clay) aggregates. The individual pellet properties are averages of 100 measurements and the bulk pellet properties are averages of 6 measurements.

TABLE G

PROPERTIES OF LYTAG, OPTIROC, AND LWA-1

| Property | LYTAG | OPTIROC | LWA-1 (40/60) IBA/PFA (1,120° C.) |
|---|---|---|---|
| Relative dry density (g/cm$^3$) | 1.48 | 0.68 | 1.55 |
| Water absorption (%) (24 hrs) for 4-19 mm (ASTM) | 15.5 | 11.0 | 22.36 |
| Bulk density (g/cm$^3$) | 0.85 | 0.39 | 0.89 |
| ACV (%) | 34.2 | 92.3 | 19.3 |
| Porosity (%) | 42.57 | 42.65 | 42.58 |

A comparison of the properties of LYTAG and the sintered LWA-1 shows that both aggregates had comparable individual and bulk aggregate densities (relative density around 1.5 g/cm$^3$, loose bulk density between 0.8 and 0.9 g/cm$^3$). While sintered LWA-1 had higher water absorption capacity than LYTAG, both aggregates showed similar porosities, indicating the more open, water-accessible pore structure of sintered LWA-1 in comparison to LYTAG. The ACV of LWA-1 were significantly less than that of LYTAG, which shows that LWA-1 can resist higher stresses as a bulk when loaded in compression. It is therefore expected that LWA-1 can produce concretes with similar strength, density, and other properties, to LYTAG concretes. OPTIROC has a very low density, relatively low water absorption, and very low strength. This is to be expected since OPTIROC has a honeycombed microstructure having a high volume of isolated spherical porosity.

In order to demonstrate the viability of sintered LWA-1 in concrete, a concrete mixture was designed and tested for fresh and hardened concrete. The mix in this example is shown in Table H which shows the proportions of individual constituents of concrete including the three types of aggregates, LYTAG, OPTIROC, and LWA-1, based on dry conditions of the aggregates. The mixtures were varied so that LYTAG and LWA-1 would achieve similar workability as measured by the slump test. The slump was slightly higher for OPTIROC. Since the aggregates were in an air-dry state at the time of casting, the differences in the total water/cement ratios were due to differences in the water absorption of the aggregates. The total water/cement ratio increased for the aggregates with increased water absorption.

The desired consistency and subsequent compaction of concrete was readily achieved with the three aggregates. The density of the fresh and hardened concrete was measured for the three aggregates and summarized in Table I below. The average compressive strengths of hardened concrete including the three aggregates were determined at the ages of 3, 7, 14, 28, and 56 days and are provided in Table I, below. The data comprises averages of 6 concrete cubes cast for each aggregate at the different ages.

TABLE H

CONCRETE MIX RATIOS (BY WEIGHT OF CEMENT) FOR THE THREE AGGREGATES

| Material | LYTAG | OPTIROC | LWA-1 (40/60) IBA/PFA (1,120° C.) |
|---|---|---|---|
| Cement | 1.0 | 1.0 | 1.0 |
| Sand | 2.11 | 2.05 | 2.11 |
| Coarse aggregate (4-19 mm) | 1.35 | 0.45 | 1.11 |
| Total water/cement ratio | 0.58 | 0.52 | 0.67 |

TABLE I

PROPERTIES OF FRESH AND HARDENED CONCRETE FROM LYTAG, OPTIROC, AND SINTERED LWA-1

| Property | LYTAG | OPTIROC | LWA-1 (40/60) IBA/PFA (1,120° C.) |
|---|---|---|---|
| Slump (mm) | 50 | 75 | 50 |
| Fresh density (g/cm$^3$) | 1.90 | 1.74 | 2.01 |
| Air dry density (g/cm$^3$) | 1.88 | 1.69 | 1.96 |
| 3 day compressive strength MPa | 40.4 | 22.5 | 38.4 |
| 7 day compressive strength MPa | 46.2 | 24.3 | 43.7 |
| 14 day compressive strength MPa | 52.2 | 25.3 | 50.7 |
| 28 day compressive strength MPa | 57.8 | 25.5 | 56.2 |
| 56 day compressive strength MPa | 62.0 | 27.7 | 61.4 |

It is apparent that concrete from the sintered LWA-1 of the invention achieved comparable compressive strengths to the corresponding concrete made from LYTAG lightweight aggregate. However, researchers have reported significantly lower compressive strengths of concrete made with LYTAG at all ages. (See, for example, U.S. Pat. No. 2003/0047114A1, issued on Mar. 13, 2003 to Kayali, et al.).

The compressive strength of concrete from sintered LWA-1 at 7, 14, 28 and 56 days was 43.7 MPa, 50.7 MPa, 56.2 MPa, and 61.4 MPa, which classifies it as high strength concrete. Comparable compressive strengths were obtained for concrete made with LYTAG. The very low strengths of concrete made with OPTIROC lightweight aggregates are attributed to the very low strengths, low densities, and high porosities of OPTIROC aggregates. Concrete made from sintered lightweight aggregates having lower water absorption capacities and similar (or higher) densities to the aggregates used in this Example may achieve even higher compressive strengths than those reported here. Thus, it is apparent that a range of concretes with compressive strengths at least comparable to concrete including LYTAG may be obtained based on the selection of the required aggregate properties for the intended application.

Leaching Tests

LWA-1 was found to be chemically inert under normal environmental conditions for applications where undesirable leaching may contaminate ground or underground water supplies, for example. The leaching of selected heavy metals was tested in accordance with the Acid Neutralization Capacity (ANC) test from lightweight sintered aggregates comprising 40%/60% IBA/PFA fired at 1,120° C. LYTAG and OPTIROC were also tested. It was found that leaching under alkaline and neutral conditions was insignificant. There was only slight leaching of certain metals under highly acidic conditions (pH<3).

Figure 9A:
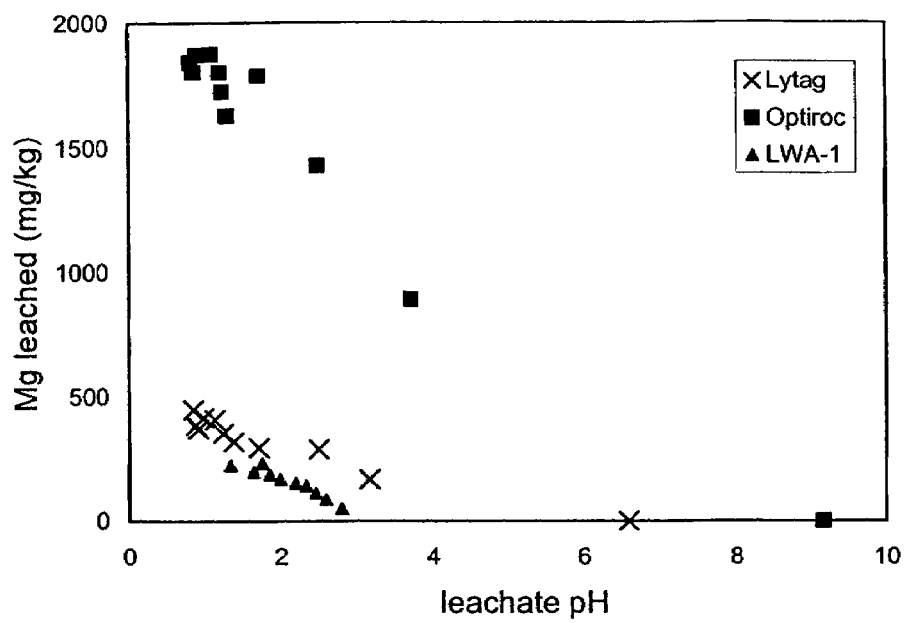
FIGS. 9a-9h show the results of leaching tests performed on aggregates, in accordance with embodiments of the present invention and commercial aggregates.

For example, it was found that there was increased magnesium leaching from OPTIROC aggregate under all pH conditions, with values of up to 1,800 mg/kg for pH<3. LWA-1 showed very low magnesium leaching for pH>3, as shown in FIG. 9a. LWA-1 was found to be the most resistant aggregate to magnesium leaching under all pH conditions.

Figure 9B:
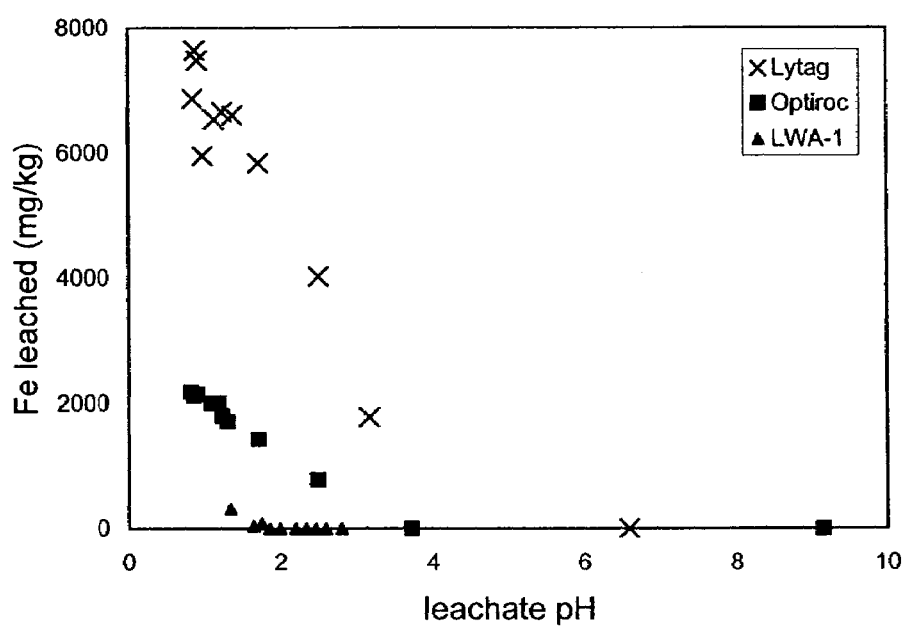

LWA-1 was found to be inert to iron (Fe) leaching for leachate pH values above 2, as shown in FIG. 9b. This is possibly due to entrapment of iron inside the matrix during the reduction of iron compounds induced by rapid sintering. There was no detectable iron leaching from LYTAG and OPTIROC under alkaline conditions. However, iron leaching from LYTAG increased substantially with increasing acid additions to values between 6,000 to 8,000 mg/kg for pH<2. The iron availability from LYTAG aggregate is believed to be due to destruction of iron oxides and hydroxides during sintering of PFA.

Figure 9C:
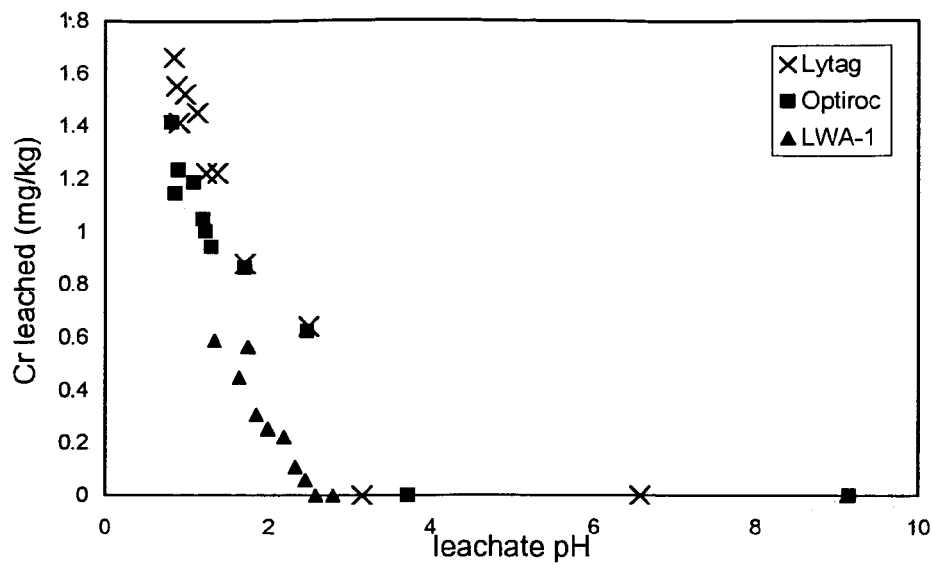

As shown in FIG. 9c, there was no significant leaching of chromium (Cr), even under very aggressive leachate pH conditions, for any of the aggregates. At a pH of 1, about 1.7 mg/kg leached from LYTAG and less leached from OPTIROC. LWA-1 showed the best results at pH of 1, with only 0.6 mg/kg leaching. For pH>3 there was practically no chromium leaching from any of the aggregates. It is believed that the chromium was very effectively encapsulated in silicate or alumino-silicate minerals in each of the aggregates, or less structured amorphous phases, in each of the aggregates, and was not, therefore, available for leaching.

Figure 9D:
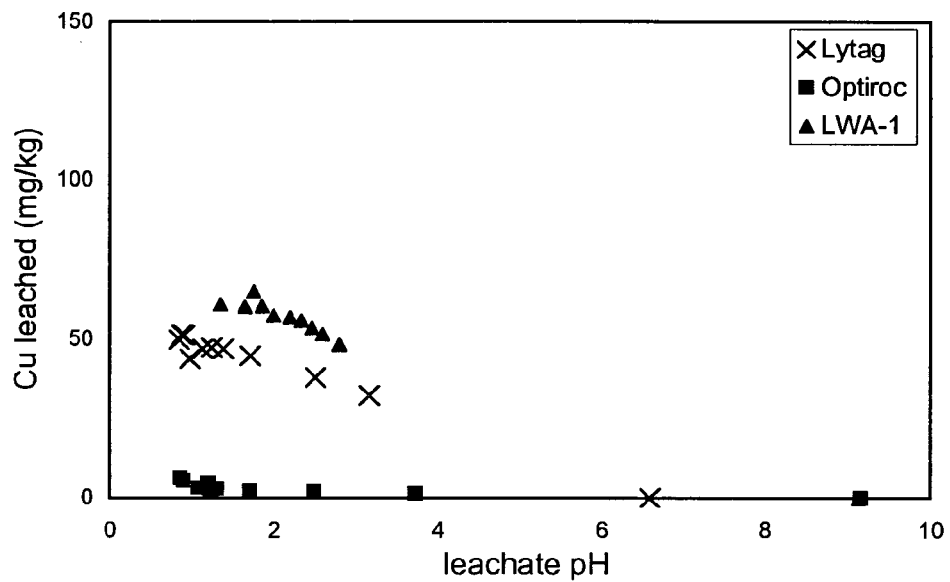

As shown in FIG. 9d, no significant copper (Cu) was released from the aggregates under alkali leachate conditions. Copper was consistently released from sintered LWA-1 and LYTAG for pH<3, reaching values around 60 mg/kg. OPTIROC aggregate showed very low copper leaching at all pH conditions.

Figure 9E:
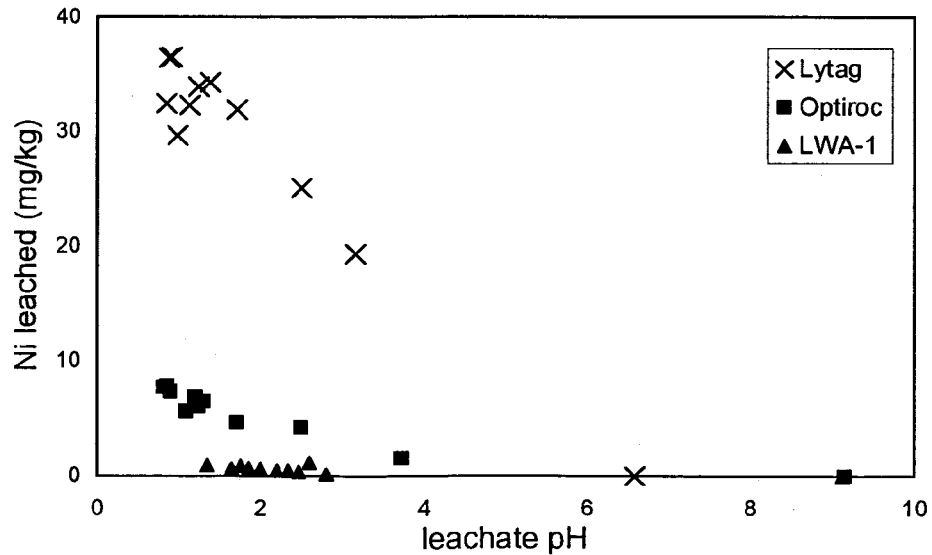

As shown in FIG. 9e, the lowest leached nickel (Ni) concentrations were observed for sintered LWA-1, down to a pH of about 1. LYTAG showed the highest nickel release at all pH conditions. For pH<6, nickel availability increased with acidity for LYTAG aggregates to values around 37 mg/kg at a pH of 1. OPTIROC showed less leaching than LYTAG.

Figure 9F:
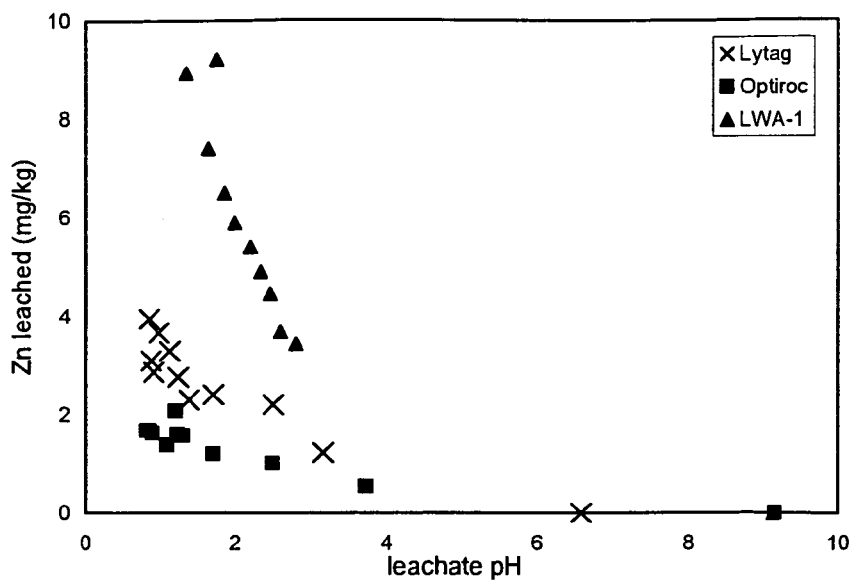

As shown in FIG. 9f, zinc (Zn) leachability was extremely low for all the aggregates examined under all pH environments. The sintered LWA-1 showed the highest zinc availability for leaching under all pH conditions, but the leachate concentrations were still very low reaching maximum values of 9 mg/kg at a pH=2.

Figure 9G:
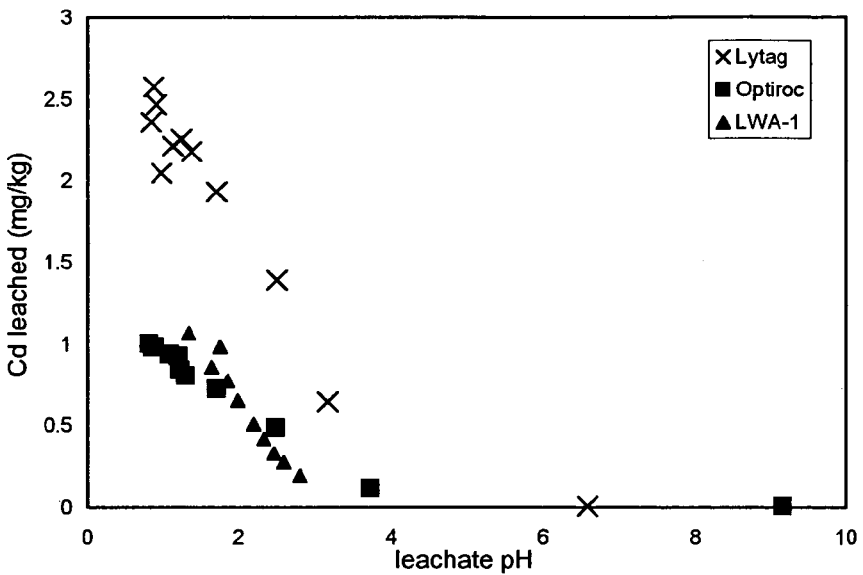

As shown in FIG. 9g, there was very low leaching of cadmium (Cd) from the sintered LWA-1 down to leachate pH values of 3. For pH<3, cadmium was released at similar levels from LWA-1 and OPTIROC, to a maximum value of 1 mg/kg. The cadmium release levels were extremely low for all aggregates at all pH conditions. Maximum cadmium release was from LYTAG, under highly acidic environments.

Figure 9H:
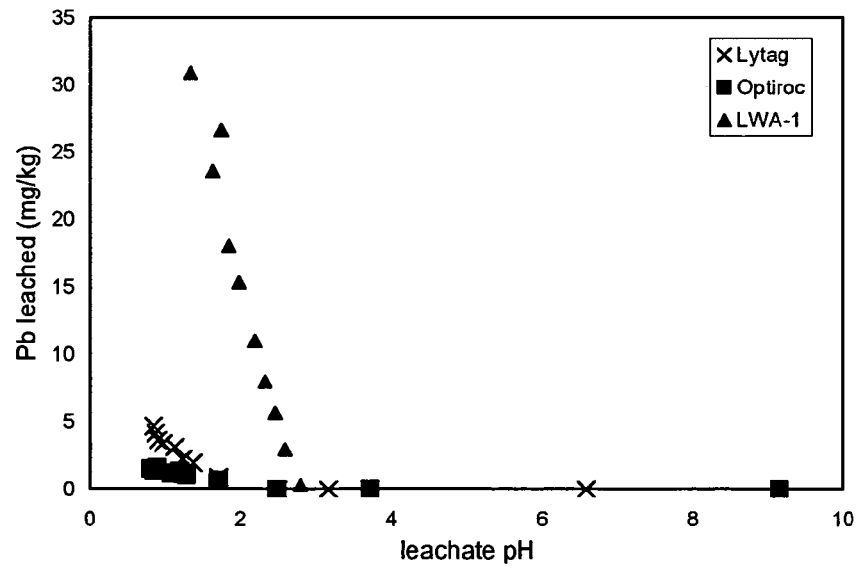

As shown in FIG. 9h, there was no detectable lead (Pb) leaching from all the aggregates for pH>3. For pH<3, lead became more available for leaching from sintered LWA-1 than the other aggregates, reaching values of around 30 mg/kg.

The proportions of these heavy metals in the aggregates leached under aggressive leachate conditions (pH=3) are summarized in Table J, below. Leaching at a pH of 3 is considered to represent the maximum fraction that is potentially available for leaching, as pH values below 3 are not normally encountered in the environment.

TABLE J

LEACHING OF HEAVY METALS FROM LWA-1

| Heavy metal | Concentration in LWA-1* (mg/kg) | Amount leached from LWA-1 (leachate pH 3) (mg/kg) | % of total |
|---|---|---|---|
| Cr | 207 | 0 | 0 |
| Cu | 528 | 48 | 9 |
| Ni | 1 | 0.1 | 10 |
| Cd | 38 | 0.2 | 0.5 |
| Zn | 759 | 3 | 0.5 |
| Pb | 229 | 0.3 | 0.1 |

*Average values from three analyses.

The most readily available heavy metals from sintered LWA-1 were copper (Cu) and nickel (Ni). About 10% of the total concentration of these metals in LWA-1 is potentially leachable under aggressive acid conditions (pH of 3). The leachable fraction of all the other heavy metals from LWA-1 is less than 1% of the total metal concentration.

While showing comparable aggregate and concrete properties to LYTAG, LWA-1 showed substantially lower leaching concentrations for iron (Fe) and the heavy metals chromium (Cr), nickel (Ni), and cadmium (Cd) under all pH conditions. The sintered LWA-1 showed similar leaching behavior to OPTIROC for most metals; however it showed significantly lower leachability for magnesium (Mg). The leaching behavior of the sintered LWA-1 for alkali and alkali earth metals, such as calcium (Ca), sodium (Na), and potassium (K), was also examined and the material showed very low leaching for all metals with values similar to LYTAG aggregates.

EXAMPLE 2

The same processing methodology used with Example 1 (the process of FIG. 8) was used for mixes of IBA with PFA and an organic material, which in this example was activated carbon waste (ACW), to increase porosity, yielding lower weight, lower density aggregates. The composition of the IBA and the PFA used in Example 2 is the same as that used in Example 1. The same equipment used in Example 1 is used here.

Figure 10:
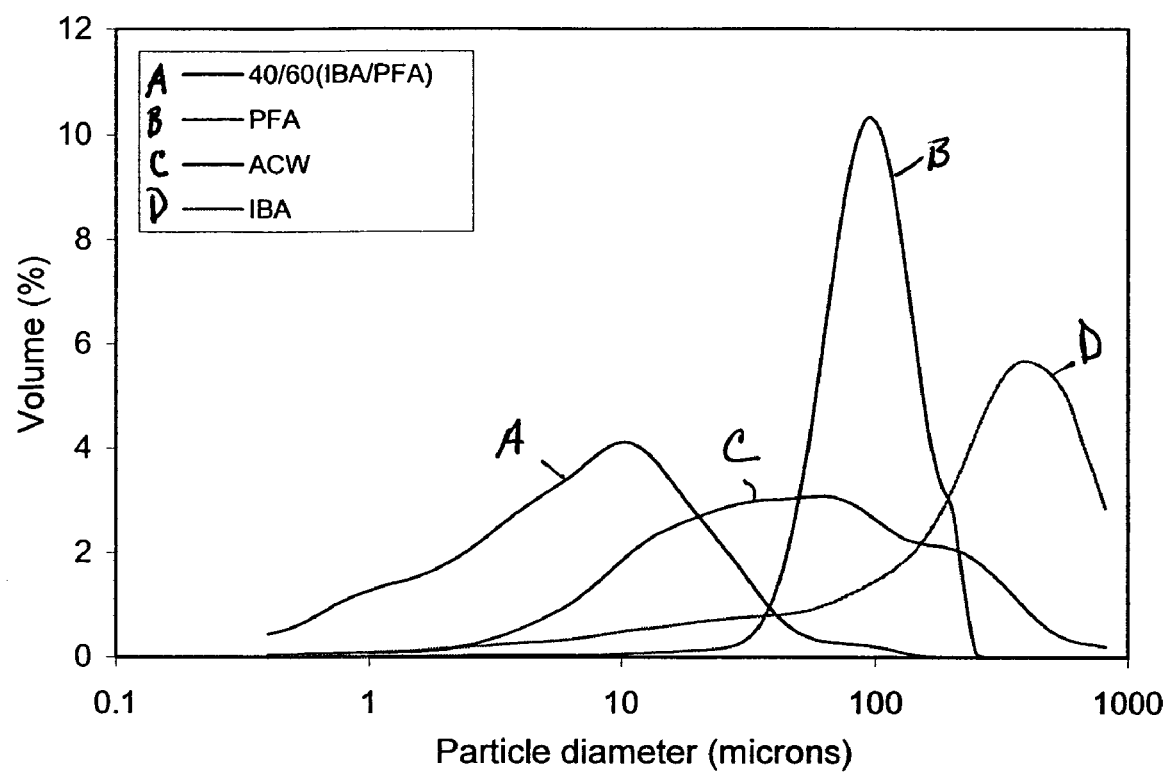
FIG. 10 shows the particle size distribution of raw IBA and PFA and wet milled IBA and PFA.

Table K below, shows the particle size distribution data of as-received ACW. The material had a mean particle size diameter of 95.31 microns. The ACW showed a wide particle size distribution, with 95% of its volume (d95 value) comprising particles finer than 347 microns. The particle size distribution decreased with milling for both raw IBA and PFA, as shown in FIG. 10.

TABLE K

PARTICLE SIZE DISTRIBUTION OF AS-RECEIVED ACW

| Volume % < | Size (microns) as-received carbon |
|---|---|
| 95 | 346.8 |
| 70 | 134.2 |
| 50 | 47.9 |
| 25 | 9.2 |
| 10 | 5.3 |

The effect of ACW on the physical properties of PFA/IBA sintered pellets were investigated and he results are shown in Table M, below. Batches of 1 kg of 100%/0%, 40%/60%, and 60%/40% (IBA/PFA) mixes containing 0%, 10%, 20%, and 30% by weight of the total IBA and PFA of ACW were wet milled for 8 hours at a water-to-solids ratio of 2 using the conditions described in detail in Example 1, above. Milled slurries were passed through 3.35 mm, 1.70 mm, and 355 micron sieves to remove coarse particles. Water was removed from the fraction less than 355 mm by pressure filtration. The resulting filter cakes were oven-dried at approximately 110° C. and ground to produce a fine powder.

The milled powder mixes of IBA, PFA, and ACW were mixed with increasing amounts of water for increasing ACW concentrations until the consistency of the mix allowed pelletization. The optimum amount of water added varied between about 35% to about 65% for carbon contents between about 1% to about 30% by weight of the IBA/PFA mix. The mix was fed to a revolving drum and the pellets collected at the end of the drum were sieved through 4 and 11.2 mm sieves (ASTM). The pellets were coated with PFA powder, as described above, and were then dried in an oven at about 110° C., overnight. The resulting green pellets were then sintered in a rotary kiln at temperatures between 1,080° C. and 1,200° C., for about 10 to about 12 minutes.

Results

The results in Table L below, show the effect of varying amounts of ACW (0%, 10%, 20%, and 30%) on the physical properties (relative density and water absorption) of aggregates produced from different mixes (100%/0%, 60%/40% and 40%/60%) of IBA/PFA. The data is an average of 6 pellet measurements.

TABLE L

PHYSICAL PROPERTIES OF SINTERED IBA/PFA/ACW AGGREGATES

| Ratio IBA/PFA | Temperature (° C.) | Average density (g/cm³) Carbon (%) | | | | Water Absorption (%) Carbon (%) | | | |
|---|---|---|---|---|---|---|---|---|---|
| | | 0 | 10 | 20 | 30 | 0 | 10 | 20 | 30 |
| 100/0 | 1080 | 1.78 | 1.73 | 1.69 | 1.63 | 21.51 | 22.98 | 24.35 | 25.34 |
| | 1090 | 2.12 | 2.09 | 2.08 | 2.06 | 3.20 | 3.41 | 3.56 | 3.66 |
| | 1100 | 2.56 | 2.55 | 2.54 | 2.55 | 1.0 | 1.07 | 1.13 | 1.19 |
| | 1110 | 2.09 | 2.08 | 2.07 | 2.07 | 0.32 | 0.32 | 0.34 | 0.45 |
| 60/40 | 1100 | 1.58 | 1.5 | 1.47 | 1.42 | 26.8 | 29.2 | 32.3 | 34.2 |
| | 1110 | 1.71 | 1.67 | 1.62 | 1.57 | 19.2 | 20.6 | 22.9 | 24.1 |
| | 1120 | 1.84 | 1.8 | 1.74 | 1.72 | 13.9 | 14.7 | 15.6 | 16.3 |
| | 1130 | 2.16 | 2.16 | 2.14 | 2.09 | 4.0 | 4.2 | 4.5 | 4.7 |
| | 1140 | 2.44 | 2.43 | 2.4 | 2.39 | 0.1 | 0.1 | 0.3 | 0.4 |
| | 1150 | 2.35 | 2.33 | 2.29 | 2.28 | 0.1 | 0.2 | 0.2 | 0.4 |
| | 1160 | 2.14 | 2.12 | 2.10 | 2.09 | 0.1 | 0.1 | 0.3 | 0.7 |
| | 1170 | 1.96 | 1.94 | 1.92 | 1.9 | 0.1 | 0.2 | 0.3 | 0.3 |
| | 1180 | 1.87 | 1.86 | 1.84 | 1.82 | 0.2 | 0.2 | 0.3 | 0.3 |
| | 1190 | 1.72 | 1.71 | 1.69 | 1.67 | 0.2 | 0.1 | 0.2 | 0.2 |
| | 1200 | 1.58 | 1.58 | 1.56 | 1.55 | 0.2 | 0.2 | 0.2 | 0.2 |
| 40/60 | 1100 | 1.55 | 1.34 | 1.29 | 1.14 | 25.0 | 34.3 | 39.1 | 42.7 |
| | 1110 | 1.59 | 1.43 | 1.35 | 1.24 | 22.9 | 31.8 | 35.2 | 38.7 |
| | 1120 | 1.65 | 1.44 | 1.36 | 1.31 | 19.8 | 26.9 | 29.6 | 32.9 |
| | 1130 | 1.69 | 1.53 | 1.48 | 1.44 | 17.7 | 23.7 | 25.4 | 28.2 |
| | 1140 | 1.78 | 1.62 | 1.63 | 1.55 | 15.4 | 19.2 | 21.8 | 23.4 |
| | 1150 | 1.81 | 1.76 | 1.7 | 1.68 | 13.8 | 16.8 | 17.2 | 18.3 |
| | 1160 | 1.92 | 1.86 | 1.82 | 1.8 | 11.0 | 13.1 | 14.2 | 15.5 |
| | 1170 | 2.07 | 1.99 | 1.98 | 1.96 | 10.1 | 12.0 | 12.5 | 12.2 |
| | 1180 | 2.28 | 2.21 | 2.19 | 2.16 | 1.8 | 2.2 | 2.3 | 2.4 |
| | 1190 | 2.39 | 2.33 | 2.29 | 2.27 | 0.1 | 0.2 | 0.4 | 0.4 |
| | 1200 | 2.16 | 2.14 | 2.1 | 2.07 | 0.2 | 0.3 | 0.4 | 0.5 |

The results show that the effectiveness of ACW in controlling density reduction associated with porosity formation in sintered aggregates depended on the PFA/IBA ratio. The effect of ACW on reducing the densities of aggregates from 100% IBA mixes was not significant. The greater ACW effect was observed for aggregates sintered at temperatures below that required for maximum densification. For example, at 1,080° C. for the addition of 30% ACW, the density was reduced by about 8%. No effect was shown at 1,100° C. It is believed that the pores created by decomposing carbon particles at low temperatures were filled with the liquid formed from the melts due to the presence of significant amounts of fluxing minerals in IBA, nullifying the effect of the ACW.

Minimal reduction in densities occurred for aggregates from 60%/40% IBA/PFA mixes at all firing temperatures. In mixes with higher PFA contents (40%/60% IBA/PFA), in contrast, ACW had a very significant effect on reducing the pellet densities. The effect was strongest at the lower temperatures and was reduced with increasing temperatures to the maximum densification temperature and above. For example, at 1,100° C. for the addition of 30% ACW, aggregate densities were reduced by about 26.5%. This reduction lessened with increasing firing temperature (at 1,120° C. and 30% ACW addition, the density was reduced by about 23%). The addition of ACW also increased the water absorption of the aggregates as a result of carbon particle oxidation at lower temperatures, increasing the porosity in the samples. The greater water absorption increases were also observed for aggregates from the mixes containing high amounts of PFA due to the slower sintering and the low mobility flow of the material melting at a given temperature.

The 40%/60% IBA/PFA mix is, therefore, the preferred combination among those studied for effective incorporation of an organic material to introduce pores in the sintered pellets. Sintered pellets comprising 40%/60% IBA/PFA mixes at 1,100° C. and the addition of ACW of 10% or more, achieved densities lower than 1.3 g/cm$^3$. Such aggregates are suitable for use in structural concrete, where lightweight aggregates are required.

To further examine the performance and properties of sintered pellets as lightweight aggregates using mixes of IBA, PFA, and ACW, aggregates produced from a 40%/60% IBA/PFA mix containing 10% ACW and pyroprocessed at 1,100° C. (referred to as LWA-2) were selected for further characterization.

Due to the rapid firing of green pellets in the rotary kiln there was a development of a grayish-black coloration of the core of the material. It is believed that the primary cause of black coring was the insufficient oxidation of carbon due to rapid firing rate. Oxygen from the atmosphere reacted with the carbon but the products of combustion were slow to escape. Carbon monoxide filled the pores in the material and reduced the iron to the ferrous state, giving rise to black coring.

The average values of individual and bulk pellet properties of sintered LWA-2 produced are given in Table M. The individual pellet properties are averages of 100 measurements and the bulk aggregate properties are averages of 6 measurements.

TABLE M

PROPERTIES OF PRODUCED IBA/PFA/ACW AGGREGATES

| Property | LWA-2 | LYTAG |
|---|---|---|
| Relative density (g/cm$^3$) | 1.32 | 1.48 |
| Water absorption (%) (24 hrs) for 4-11.2 mm (ASTM) | 31.9 | 15.5 |
| Bulk density (g/cm$^3$) | 0.79 | 0.85 |
| ACV (%) | 45.2 | 34.2 |

LWA-2 had a relative density of 1.3 g/cm$^3$, loose bulk density of 0.8 g/cm$^3$, and ACV of 45%. LWA-2 had high water absorption due to carbon decomposition during firing, which is also responsible for the reduced strength.

A concrete mixture was prepared and tested for fresh and hardened concrete. The mix design is given in Table N which shows the proportions of individual constituents based on dry conditions of the aggregates. The mix design was performed so that the average compressive strengths of the hardened concrete with sintered LWA-2 were determined at the ages of 7, 14, 28, and 56 days. The results are summarized in Table P, below, along with the properties of concrete from LYTAG aggregates.

TABLE N

CONCRETE MIX RATIOS (BY WEIGHT OF CEMENT) FOR LWA-2

| Material | LWA-2 (40/60) IBA/PFA & 10% ACW (1,100° C.) | LYTAG |
|---|---|---|
| Cement | 1.0 | 1.0 |
| Sand | 2.11 | 2.11 |
| Coarse aggregate (4-11.2 mm) (ASTM) | 1.00 | 1.35 |
| Total water/cement ratio | 0.70 | 0.58 |

TABLE O

PROPERTIES OF FRESH AND HARDENED CONCRETE FROM LYTAG, AND LWA-2

| Property | LWA (40/60) IBA/PFA (1100° C.) | LYTAG |
|---|---|---|
| Slump (mm) | 50 | 50 |
| Fresh density (g/cm$^3$) | 2.00 | 1.90 |
| Air dry density (g/cm$^3$) | 1.96 | 1.88 |
| 3 day compressive strength MPa | 32.9 | 40.4 |
| 7 day compressive strength MPa | 38.4 | 46.2 |
| 14 day compressive strength MPa | 43.5 | 52.2 |
| 28 day compressive strength MPa | 46.6 | 57.8 |
| 56 day compressive strength MPa | 49.1 | 62.0 |

The aggregate properties of LWA-2 are lower than LYTAG and OPTIROC aggregates. (It is noted that data for OPTIROC, which is the same as shown in Example 1, is not included in Table P.) The same trend was observed for the compressive strength of concrete made with LWA-2. Concrete made with LWA-2 had a 28-day strength of 47 N/mm$^2$, compared to 26 N/mm$^2$ for concrete made with OPTIROC and 58 N/mm$^2$ for concrete made with LYTAG.

Leaching Tests

The ANC test was conducted on LWA-2 in order to examine its leachability under different pH environments. As with LWA-1, discussed above, LWA-2 was found to be chemically inert under normal environmental conditions and had lower leaching concentrations of heavy metals compared to LWA-1 and the commercial aggregate.

Figure 11A:
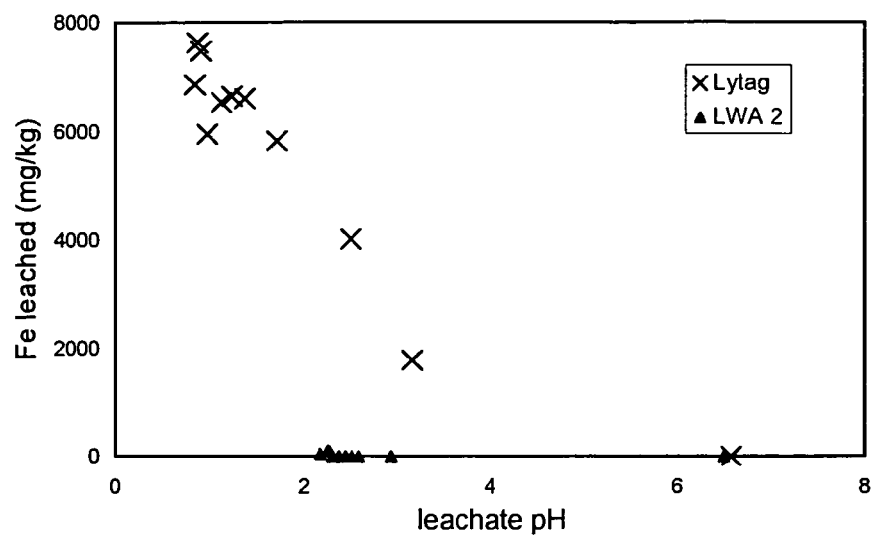
FIGS. 11a-11c show selected results of leaching tests performed on aggregates, in accordance with embodiments of the present invention and commercial aggregates.

As shown in FIG. 11a, LWA-2 was relatively inert to iron (Fe) leaching for all leachate pHs. LYTAG, in contrast, showed increased iron leaching up to values of 8,000 mg/kg under very acidic environments.

Figure 11B:
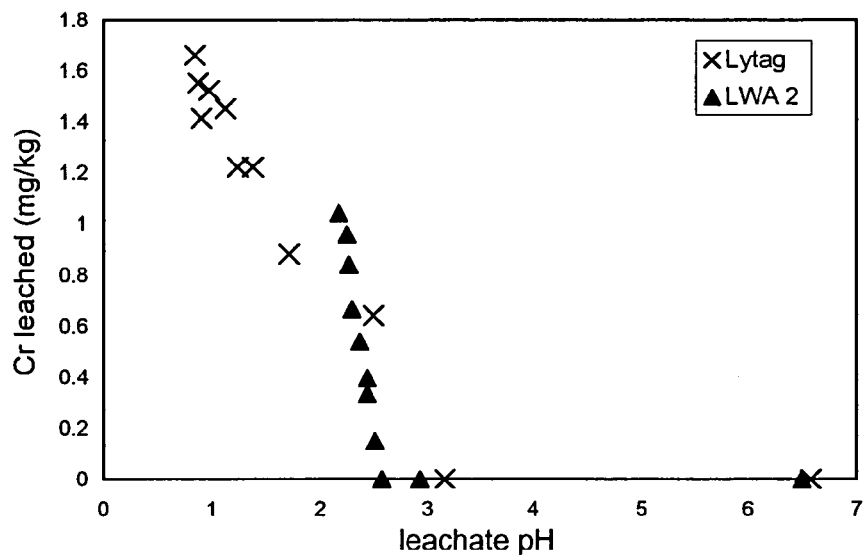

As shown in FIG. 11b, LWA-2 showed no chromium (Cr) leaching, for pH above 3, which was similar to LYTAG. At lower pHs, however, chromium leached from LWA-2 more rapidly but at lower concentrations than from LYTAG. Chromium leaching concentrations were extremely low, with a maximum of 1.8 mg/kg for LYTAG at pH=1. The rapid leachability of chromium from LWA-2 at very low pHs is believed to be due to the low acid neutralization capacity of the material.

LWA-2 showed lower copper (Cu) release than LYTAG for all pHs above 3. However, at lower pHs, small increases in acidity resulted in significant copper leaching increases to values of around 130 mg/kg.

Figure 11C:
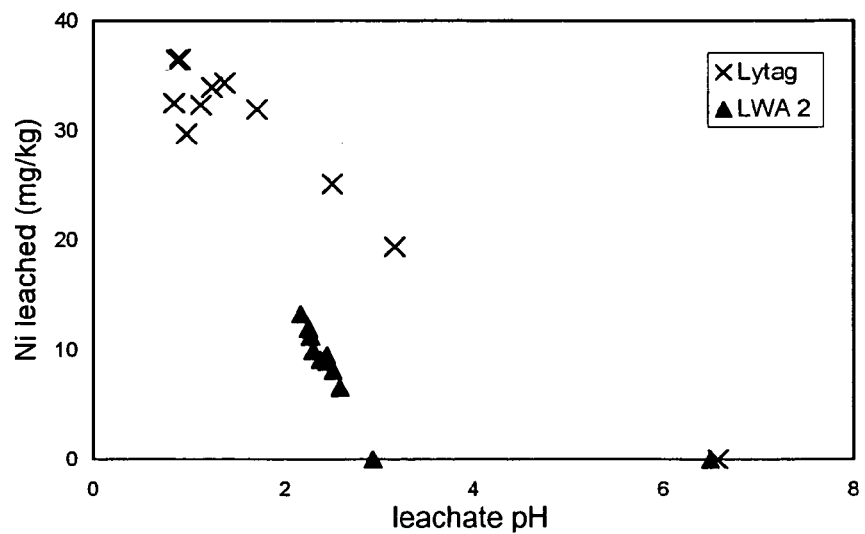

As shown in FIG. 11c, LWA-2 showed very low nickel (Ni) concentrations under all pHs and substantially lower than LYTAG.

Zinc (Zn) leachability was extremely low for LWA-2 at all pHs. LWA-2 showed practically no zinc leaching for pH values above 3, but at lower pH values, zinc release increased rapidly.

There was practically no detectable leaching of cadmium (Cd) from the sintered LWA-2 down to leachate pH values of 3. For pH<3 cadmium was released at lower levels from LWA-2 than LYTAG at all pHs. However, the cadmium release levels were extremely low for all aggregates at all pH conditions.

There was no detectable lead (Pb) leaching from all the aggregates for pH>3. For pH<3, lead becomes available for leaching from LWA-2 reaching values of around 6 mg/kg, which was similar to LYTAG.

The values of the above heavy metals leached from the sintered LWA-2 under aggressive leachate conditions (leachate pH=3) have been summarized in Table P, together with their percentages of the total metal concentrations present.

TABLE P

LEACHING OF HEAVY METALS FROM LWA-2

| Heavy metal | Concentration in LWA-2* (mg/kg) | Amount leached from LWA-2 (leachate pH 3) (mg/kg) | % of total |
|---|---|---|---|
| Cr | 180 | 0 | 0 |
| Cu | 535 | 0 | 9 |
| Ni | 15 | 0 | 10 |
| Cd | 40 | 0.01 | 0.03 |
| Zn | 284 | 0 | 0 |
| Pb | 89 | 0 | 0.1 |

*average values from three analyses

LWA-2 is a high-value, consistent lightweight aggregate, from which there is no detectable leachable fraction of heavy metals for leachate pH values of 3. While rapid release of heavy metals was observed at leachate pH values lower than 3, aggregates are not normally exposed at such low pHs, and the leaching concentrations were very still low in comparison with the total heavy metal concentrations present and the heavy metal release of the commercial aggregates LYTAG and OPTIROC.

The embodiments described herein are examples of implementations of the invention. Modifications may be made to these examples without departing from the spirit and scope of the invention, which is defined by the claims, below.

I claim:

1. A method for producing a lightweight aggregate, comprising:
    mixing incinerator bottom ash ("IBA") from a municipal solid waste incinerator and pulverized fuel ash ("PFA") from coal combustion;
    agglomerating the mixture to form an agglomerate; and
    pyroprocessing the agglomerate to a temperature to expand the agglomerate to form a lightweight aggregate having pores and a relative density of less than 2 grams per cubic centimeter.

2. The method of claim 1, comprising:
    wet milling the IBA.

3. The method of claim 1, comprising:
    agglomerating the mixture by pelletizing.

4. The method of claim 1, further comprising:
    wet milling the IBA;
    removing water from the IBA after wet milling; and
    using at least some of the removed water during agglomerating.

5. The method of claim 1, further comprising:
    wet milling the IBA;
    removing water from the IBA after wet milling;
    quenching the pyroprocessed agglomerate; and
    using at least some of the removed water during quenching.

6. The method of claim 1, further comprising:
    controlling one or more selected properties of the aggregate based, at least in part, on a proportion of the IBA to the PFA and the pyroprocessing temperature.

7. The method of claim 6, wherein a selected property is density, the method comprising:
    controlling density of the aggregate based, at least in part, on the proportion and the temperature.

8. The method of claim 6, wherein a selected property is water absorption, the method comprising:
    controlling water absorption of the aggregate based, at least in part, on the proportion and the temperature.

9. The method of claim 1, further comprising:
    mixing an organic material with the mixture of the IBA and the PFA; and
    controlling one or more selected properties of the aggregate based, at least in part, on a proportion of organic material in the mixture.

10. The method of claim 9, wherein a selected property is density, the method comprising:
    controlling density of the aggregate, based at least in part, on the proportion of organic material in the mixture.

11. The method of claim 9, wherein a selected property is water absorption, the method comprising:
    controlling water absorption of the aggregate based, at least in part, on the proportion of organic material in the mixture.

12. The method of claim 1, comprising:
    pyroprocessing the agglomerate to cause volatilization and entrapment of volatized gases.

13. The method of claim 1, comprising:
    pyroprocessing the agglomerate in a rotary kiln.

14. The method of claim 1, further comprising:
    reducing the particle size of the IBA prior to mixing.

15. The method of claim 1, further comprising:
mixing the IBA and the PFA with an organic material.

16. The method of claim 1, comprising:
mixing from 30% to 70% IBA by dry weight of the mixture with from 70% to 30% PFA by dry weight of the mixture pulverized fuel ash ("PFA").

17. The method of claim 1, comprising:
agglomerating the mixture by extrusion.

18. The method of claim 1, wherein the lightweight aggregate has a water absorption of 10% or less.

19. The method of claim 1, comprising:
pyroprocessing the agglomerate to a temperature of from about 1,000° C. to about 1,300° C.

20. The method of claim 1, comprising:
pyroprocessing the agglomerate to a temperature to expand and vitrify the agglomerate.

21. The method of claim 1, comprising:
pyroprocessing the agglomerate to a temperature to form a glassy, crystalline, expanded lightweight aggregate.

22. A method for producing a lightweight aggregate, comprising:
mixing incinerator bottom ash ("IBA") from a municipal solid waste incinerator and pulverized fuel ash ("PFA") from coal combustion;
agglomerating the mixture to form an agglomerate; and
pyroprocessing the agglomerate to form a lightweight aggregate having pores and a relative density of less than 2 grams per cubic centimeter and a water absorption of 10% or less.

23. The method of claim 22, comprising:
pyroprocessing the agglomerate to a temperature to expand the agglomerate.

24. The method of claim 22, further comprising:
controlling one or more selected properties of the aggregate based, at least in part, on a proportion of the IBA to the PFA and the pyroprocessing temperature.

25. The method of claim 22, comprising:
pyroprocessing the agglomerate in a rotary kiln.

26. The method of claim 22, further comprising:
mixing the IBA and the PFA with an organic material.

* * * * *